US007592408B2

(12) United States Patent
Wilson, Jr. et al.

(10) Patent No.: US 7,592,408 B2

(45) Date of Patent: Sep. 22, 2009

(54) OLEFIN COPOLYMERS CONTAINING HYDROLYTICALLY CLEAVABLE LINKAGES AND USE THEREOF IN DEGRADABLE PRODUCTS

(75) Inventors: Robert B. Wilson, Jr., Palo Alto, CA (US); Sigridur Jonasdottir, Mountain View, CA (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 12/128,411

(22) Filed: May 28, 2008

(65) Prior Publication Data

US 2008/0227940 A1 Sep. 18, 2008

Related U.S. Application Data

(60) Division of application No. 11/288,771, filed on Nov. 28, 2005, now Pat. No. 7,399,817, which is a division of application No. 10/392,270, filed on Mar. 18, 2003, now Pat. No. 7,037,992, which is a continuation-in-part of application No. 09/900,597, filed on Jul. 6, 2001, now Pat. No. 6,534,610, which is a division of application No. 09/408,286, filed on Sep. 29, 1999, now Pat. No. 6,288,184.

(51) Int. Cl.
*C08F 130/02* (2006.01)

(52) U.S. Cl. ....................... 526/274; 526/277; 526/279; 526/287; 526/298; 526/303.1; 526/307.8; 526/312; 526/314; 526/315; 526/323

(58) Field of Classification Search ................. 526/274, 526/277, 279, 287, 298, 303.1, 307.8, 312, 526/314, 315, 323
See application file for complete search history.

(56) References Cited

U.S. PATENT DOCUMENTS

| | | | |
|---|---|---|---|
| 4,610,962 | A | 9/1986 | Takagi et al. |
| 4,761,322 | A | 8/1988 | Raley |
| 4,767,627 | A | 8/1988 | Caldwell et al. |
| 4,795,786 | A | 1/1989 | Umpleby |
| 4,981,749 | A | 1/1991 | Kubo et al. |
| 5,047,476 | A | 9/1991 | Keogh |
| 5,219,646 | A | 6/1993 | Gallagher et al. |
| 5,280,094 | A | 1/1994 | Mulhall |
| 5,281,681 | A | 1/1994 | Austin |
| 5,439,996 | A | 8/1995 | Baird et al. |
| 5,521,260 | A | 5/1996 | Futaesaku et al. |
| 5,563,219 | A | 10/1996 | Yasuda et al. |
| 5,817,394 | A | 10/1998 | Alikhan et al. |
| 5,854,356 | A | 12/1998 | Bergstrom et al. |
| 5,891,979 | A | 4/1999 | Dammert et al. |
| 6,086,792 | A | 7/2000 | Reid et al. |
| 6,120,587 | A | 9/2000 | Elfersy et al. |
| 6,127,482 | A | 10/2000 | Keogh |
| 6,207,763 | B1 | 3/2001 | Wang et al. |
| 6,211,275 | B1 | 4/2001 | Xanthos et al. |
| 6,288,184 | B1 | 9/2001 | Wilson, Jr. et al. |
| 6,362,276 | B1 | 3/2002 | Harris et al. |
| 6,416,546 | B1 | 7/2002 | Kimura et al. |
| 6,534,610 | B1 | 3/2003 | Wilson, Jr. et al. |

FOREIGN PATENT DOCUMENTS

| | | |
|---|---|---|
| EP | 0442476 | 8/1991 |
| EP | 0462588 | 12/1991 |
| EP | 0799842 | 10/1997 |
| EP | 1041580 | 4/2000 |
| WO | WO 92/12185 | 7/1992 |
| WO | WO 97/45465 | 12/1997 |
| WO | WO 98/37110 | 8/1998 |

OTHER PUBLICATIONS

Hatakeyama et al. (1998), "Synthesis and Physical Properties of Polyurethanes from Saccharide-based Polycaprolactones," *Macromol. Symp.* 130:127-138.

Höcker (1998), "Polymeric Materials as Biomaterials under Particular Consideration of Biodegradable Polymers," *Macromol. Symp.* 130:161-168.

(Continued)

*Primary Examiner*—Bernard Lipman
(74) *Attorney, Agent, or Firm*—Issac M. Rutenberg; Mintz, Levin, Cohn, Ferris, Glovsky and Popeo, PC

(57) ABSTRACT

The invention is directed to olefin copolymers composed of nonhydrolyzable monomer units and hydrolyzable monomer units, the latter resulting from copolymerization of monomers containing a linkage that is hydrolytically cleavable in the presence of aqueous base or aqueous acid. Generally, the hydrolyzable monomer units represent a significant fraction of the copolymer, such that upon hydrolysis, a substantial portion of the copolymer is degraded into low molecular weight fragments. Also provided are degradable articles that are at least partially composed of a degradable copolymer in which hydrolyzable monomer units represent at least 20 mole % of the copolymer. These degradable articles include agricultural film products, adhesive tape substrates, bed linens, containers, disposable absorbent articles, packaging materials, bags, labels, pillow cases, protective clothing, surgical drapes, sponges, tampon applicators, disposable syringes, temporary enclosures and temporary siding, toys, wipes, foamed plastic products, and controlled release pellets, strips and tabs.

20 Claims, 3 Drawing Sheets

OTHER PUBLICATIONS

Johnson et al. (1995), "New Pd(II)- and Ni(II)-Based Catalysts for Polymerization of Ethylene and α-Olefins," *J. Am. Chem. Soc.* 117(23):6414-6415.

Johnson et al. (1996), "Copolymerization of Ethylene and Propylene with Functionalized Vinyl Monomers by Palladium(II)-Catalysts," *J. Am. Chem Soc.* 118(1):267-268.

Killian et al. (1997), "Preparation of Linear α-Olefins Using Cationic Nickel(II) α-Diimine Catalysts," *Organometallics* 16(10):2005-2007.

Kricheldorf et al. (1998), "Biodegradable Liquid-crystalline Aromatic Polymers," *Macromol. Symp.* 130:261-270.

Moine et al. (1998), "New pH Sensitive Network: Combination of an Amphiphilic Degradable Polyester with a β-cyclodextrin Copolymer," *Macromol. Symp.* 130:45-52.

Otani et al. (1998), "Preparation of Rapidly Curable Hydrogels from Gelatin and Poly(carboxylic acid) and Their Adhesion to Skin," *Macromol. Symp.* 130:169-177.

Ouchi et al. (1968), "Copolymerization of Diallylidenepentaerythritol," *J. Chem. Soc. Japan* 71(7):1078-1082.

Rosciszewski et al. (1998), "Bidegradation of Polyorganosiloxanes," *Macromol. Symp.* 130:337-346.

Small et al. (1998), "Highly Active Iron and Cobalt Catalysts for the Polymerization of Ethylene," *J. Am. Chem. Soc.* 120(16):4049-4050.

Smorada (1987), *Encyclopedia of Polymer Science and Engineering* 10:227-253, J.I. Kroschwitz, ed., New York: John Wiley & Sons.

Stapert et al. (1998), "Synthesis and Characterization of Aliphatic Poly(ester-amid)s Containing symmetrical Bisamide Blocks," *Macromol. Symp.* 130:91-102.

Swift et al. (1998), "Water-Soluble Biodegradable Polymers: Synthetic or Natural-Based Raw Materials," *Macromol. Symp.* 130:379-391.

Tian et al. (1998), "Ring-Opening Polymerization of 1,4,8-Trioxaspiro-[4,6]-9-Undecanon: A Route to Novel Molecular Architectures for Biodegradable Polyesters," *Macromol. Symp.* 130:217-227.

Hydrolyzable Comonomer Used in Example 1(a)

Copolymer From Example 1(a)

Hydrolysis Data

OLEFIN COPOLYMERS CONTAINING HYDROLYTICALLY CLEAVABLE LINKAGES AND USE THEREOF IN DEGRADABLE PRODUCTS

CROSS-REFERENCE TO RELATED APPLICATIONS

This is a divisional of U.S. patent application Ser. No. 11/288,771, filed Nov. 28, 2005, now U.S. Pat. No. 7,399,817 which is a divisional of U.S. patent application Ser. No. 10/392,270, filed Mar. 18, 2003, now U.S. Pat. No. 7,037,992 which is a continuation-in-part of U.S. patent application Ser. No. 09/900,597, filed Jul. 6, 2001, now U.S. Pat. No. 6,534,610, which is a divisional of U.S. patent application Ser. No. 09/408,286, filed Sep. 29, 1999, now U.S. Pat. No. 6,288,184. The disclosures of the aforementioned applications are incorporated by reference in their entireties.

TECHNICAL FIELD

This invention relates generally to olefin copolymers, and more particularly pertains to olefin copolymers containing hydrolytically cleavable linkages, and to methods for synthesizing and using such copolymers. The invention additionally relates to recyclable products composed of olefin copolymers containing linkages that are hydrolytically cleavable at an acidic and/or basic pH. The invention has utility in a variety of fields, including not only polymer chemistry per se, but also in the recycling and waste disposal industries, and in those areas of manufacture in which recyclable products are desirable.

BACKGROUND

While a number of biodegradable polymers have been found to possess the desirable characteristics of biodegradability and compostability, they often lack additional properties that are desired or necessary to provide more commercially acceptable products. At room temperature many biodegradable polymers are either too brittle to provide the desired puncture and tear resistance necessary for many applications, or they do not have adequate stability for storage and transport. In addition, many biodegradable polymers are difficult to process into films using commercial manufacturing lines.

In attempts to overcome such difficulties, blends of polymeric materials with other polymers or with naturally biodegradable components have been attempted in efforts to develop thermoplastic films with improved degradable properties. For example, U.S. Pat. No. 4,133,784 to Otey et al. describes degradable mulch films with improved moisture resistance prepared from starch and ethylene/acrylic acid copolymers. U.S. Pat. No. 5,091,262 to Knott et al. describes a multilayer polyethylene film containing a starch filled inner layer, and prodegradant filled outer layers. U.S. Pat. No. 5,108,807 to Tucker describes a multilayer thermoplastic film having a core layer made of polyvinyl alcohol, and outer layers made of polyethylene and prodegradant. U.S. Pat. No. 5,391,423 to Wnuk et al. describes multilayer films prepared from various biodegradable polymers for use in disposable absorbent products, such as diapers, incontinent pads, sanitary napkins, and pantyliners.

Typical, non-degradable or slowly degradable plastic products in the form of sheets and films (e.g., as in plastic trash bags and package wrapping materials) are made primarily from hydrocarbon polymers such as polyethylene, polypropylene, or polyvinyl polymers. The combination of such hydrocarbon polymers with starch has not been very widely accepted. For example, trash bags incorporating starch with other hydrocarbon components can be physically degradable, which means they are broken into many small parts as the starch biodegrades. See, for example, U.S. Pat. No. 4,016,117 to Griffin, and U.S. Pat. No. 4,337,181 to Otey et al. See also Pettijohn (1992), "Starch/Polyolefin Blends as Environmentally Degradable Plastics," *Chemtech,* 627; Willett (1994) *J. Appl. Polym. Sci.* 54:1685-1695. Initially, the starch particles exposed at, or adjacent to the surface of these starch-containing products, are initially biodegraded and leached away. This is followed by successive biodegradation of starch particles at the interior of the product to provide a cellular structure that is more readily attacked by the processes of oxidation, hydrolysis, direct enzyme action or combinations of these processes. However, such starch-containing products still leave behind a non-biodegradable polymer residue as recognized in the art, for example by U.S. Pat. No. 5,219,646 to Gallagher et al. The hydrocarbon components remain resistant to degradation and to mineralization. In certain circumstances, it is believed that the hydrocarbon component even has a tendency to encapsulate the starch and thereby preventing further biodegradation of the starch. Furthermore, materials incorporating large amounts of starch can be very sensitive to moisture and can have mechanical properties that vary considerably with humidity levels. Accordingly, improved polymeric compositions for making better biodegradable films are needed.

There is also a need for degradable fibers that can be widely used without polluting the environment. Such improved fibers are needed as fishing materials, such as fishing lines and fish nets; in agricultural materials such as insect or bird nets and as vegetation nets; in cloth fibers and non-woven fibers for articles for everyday life; in personal care products such as diapers, incontinence pads, sanitary napkins, pantyliners, tampons, and diapers; and in medical supplies such as operating sutures that are not removed, operating nets and suture-reinforcing materials. Fibers that are degradable by the action of microorganisms have been described. Examples of such fibers comprising lactones or polyester fibers are described in U.S. Pat. No. 6,235,393 to Kimura et al. However, such fibers are difficult and/or expensive to manufacture while maintaining quality control, and some products are difficult to use due to insufficient flexibility. A recently popular form of fiber made from synthetic polymers is referred to as "bicomponent" fibers. A bicomponent fiber comprises a core fiber made from one polymer that is encased within a thermoplastic sheath made from a different polymer. The polymer comprising the sheath often melts at a different, typically lower, temperature than the polymer comprising the core. As a result, such bicomponent fibers can provide thermal bonding by controlled melting of the sheath polymer, while retaining the desirable strength characteristics of the core polymer. An outer sheath is typically comprised of polyethylene, polypropylene, certain polyesters, and the like, that often have softening and/or melting points in the range of about 50° C. to about 200° C. Generally, however, such fibers are still difficult and/or expensive to manufacture.

There are a number of other polymer-based products for which degradability and/or compostability would be desirable. For example, films and laminates that are used in packaging materials, as topsheets and backsheets in diapers, and as agricultural ground coverings are intended to survive intact for only a short period of use. Other polymer-based products for which degradability is desirable are molded articles such as tampon applicators, disposable syringes, milk bottles, shopping bags, food wrappers, beverage "six-pack" rings, and the like. Ideally, such molded articles would be substantially degraded in the sewage system or septic tank, or would decompose at the site of disposal so as to avoid causing visual litter problems or hazards to wildlife.

Plastic film products for agricultural mulching are representative of the problems that can be caused by the persistence of synthetic polymers. Polyethylene is the most common polymer used in making agricultural mulch products, and blends with starch have similar drawbacks to those described above for trash bag containers. Like flexible film products for packaging and garbage bags, such agricultural mulch products can persist for many years and become a nuisance. There is a need for plastic mulch products that can decompose by the end of a growing season. Improved degradability would also be desirable to provide items for "controlled release" of active agents from other agricultural products, such as encapsulated pesticides, herbicides, and fertilizers.

Several approaches to enhance the environmental degradability of polymers have been suggested and tried. Photosensitizing groups have been added into the molecular structure of the polymer, and small amounts of selective additives have been incorporated to accelerate oxidative and/or photo-oxidative degradation. However, photodegradation only works well if the plastic is exposed to light, and provides no benefit if the product is disposed of in a dark environment such as ground water, soil or a standard landfill. Also, oxidative accelerators can cause unwanted changes in the mechanical properties of the polymer, such as embrittlement, prior to or during use.

Another approach to environmental degradability of articles made with synthetic polymers is to make the polymer itself biodegradable or compostable. See Swift (1993) *Acc. Chem. Res.* 26:105-110 for a general overview on biodegradable polymeric compositions. Most of this work has been based on hydrolyzable polyester compositions, chemically modified natural polymers such as cellulose or starch or chitin, certain polyamides, or blends thereof. See, for example, U.S. Pat. No. 5,219,646 to Gallagher et al. (blend of hydrolyzable polyester and starch). Polyvinyl alcohol is the only synthetic high molecular weight addition polymer with no heteroatom in the main chain generally acknowledged as biodegradable, but consistent polymeric production is difficult. See also Hocking (1992) *J. Mat. Sci. Rev. Macromol. Chem. Phys*. C32(1): 35-54, Cassidy et al. (1981) *J. Macromol. Sci.—Rev. Macromol. Chem*. C21(1):89-133, and "Encyclopedia of Polymer Science and Engineering," 2nd. ed.; Wiley & Sons: New York, 1989; Vol. 2, p 220. (Limited reports add poly (alkyl 2-cyanoacrylates) to this list of biodegradable synthetic polymers.)

Natural rubber (cis-1,4-polyisoprene) is also readily biodegradable. Natural rubber retains carbon-carbon double bonds in the polymer backbone, which are believed to facilitate attack by either oxygen and/or microbes/fungi, leading subsequently to chain scission, molecular weight reduction, and eventually total degradation of the polymer. See Heap et al. (1968) *J. Appl. Chem.* 18:189-194. The precise mechanism for the biodegradation of natural rubber is not known. Enzymatic and/or aerobic oxidation of the allylic methyl substituent may be involved. See Tsuchii et al. (1990) *Appl. Env. Micro.,* 269-274, Tsuchii et al. (1979) *Agric. Biol. Chem.* 43(12): 2441-2446, and Heap et al., supra. By contrast, nonbiodegradable polymers such as polyethylene, polypropylene, polyvinyl chloride, polyacrylonitrile, poly(meth)acrylates and polystyrene have saturated carbon-carbon backbones that do not facilitate attack by either oxygen and/or microbes. This biodegradability has been recognized only for the natural form of rubber.

Unfortunately, natural rubber is biodegradable to the extent that it is too unstable for most uses. Natural rubber also suffers from poor mechanical properties (e.g., strength, creep resistance). Indeed, stabilizers, fillers, and/or crosslinking agents are routinely added to natural rubber to enhance its mechanical properties. Crosslinkers are typically required in order to provide sufficient mechanical integrity for practical use. However, the most common crosslinking process creates a polysulfide linkage, i.e., by vulcanization, that virtually eliminates the biodegradability of natural rubber. See Tsuchii et al. (1990) J. Appl. Polym. Sci. 41:1181-1187. Crosslinked natural rubber is also elastomeric and thermosetting, thus making it unsuitable for blown or extruded films, injection molded articles, fibers or other melt-processed articles.

It would be desirable to provide polymer-containing products that: (1) are biodegradable in the environment, as well as degradable or compostable during municipal waste handling operations; (2) are thermoplastic so that they can be molded, cast, extruded, or otherwise melt-processed into various forms including films, fibers, coatings, foams, and the like; (3) can be manufactured at reasonable cost; and (4) have sufficient toughness, strength and stability during use until they are appropriately disposed of. Therefore, polymers or copolymers are needed that provide reproducible and predictable properties with respect to degradation and environmental hydrolysis, and that hydrolyze to a very significant extent to provide small, soluble, and generally nontoxic polymer fragments.

For many purposes, the superior physical properties provided by polyolefins prepared by addition polymerization are desirable. To date, however, the incorporation of polar moieties, e.g., hydrolyzable polar linkages, into such polymers has had limited success, since many polar monomers poison, or competitively coordinate with, the organometallic polymerization catalysts that are typically used. Copolymers of olefins, such as ethylene, with polar monomers such as acrylates, were initially limited to block copolymers, formed by two-stage polymerization, e.g., by post-polymerization of an acrylate or methacrylate monomer onto a previously formed polyolefin chain. See U.S. Pat. No. 5,563,219 to Yasuda et al., EP 0799842 to Yasuda et al., EP 0462588 to Goto et al., and EP 0442476 to Hajime et al. JP Kokai 4-45108 pertains to the preparation of an ethylene copolymer containing 4.7 mole % ethyl acrylate (number average molecular weight $M_n$ of 9,100, weight average molecular weight $M_w$ of 22,500) that is described as exhibiting improved adhesion relative to homopolymeric polyethylene. Johnson et al. (1996), *J. Am. Chem. Soc.* 118:267-8, described the formation of random olefin-acrylate copolymers using Brookhart-type catalysts. None of these polymers, however, include hydrolyzable linkages in the backbone of the polymer, and therefore they would not be hydrolytically degradable.

Ouchi et al. (1968), *J. Chem. Soc. Japan* 71(7): 1078-82, described free radical copolymerization of styrene and other vinyl monomers with a monomer containing a hydrolyzable linkage, diallylidene pentaerythritol (DAPE). However, the process resulted in a copolymer (1) in which relatively little hydrolyzable monomer was incorporated, or (2) exhibiting a significant loss in intrinsic viscosity at higher levels of incorporation. Higher levels of hydrolyzable monomer incorporation were also found to be associated with a lower polymerization rate. Additionally, the reaction conditions employed would be expected to result in a non-stereoregular polymer.

Austin et al., in International Patent Publication No. WO 92/12185, describes a method for making biodegradable and photodegradable polymers containing ester linkages. The disclosed polymerization method involves a radical-initiated ring-opening copolymerization reaction between ethylene and a cyclic ketene acetal, 2-methylene-1,3-dioxepane (MDOP). The resulting copolymer contains both ethylene monomer units (—$CH_2$—$CH_2$—) and ester-containing monomer units having the structure —(CO)—O—$(CH_2)_4$—. The maximum amount of the ester-containing monomer units incorporated into the copolymer, however, was only 3.20 mole %, even when the amount of MDOP in the feed was increased to 25 wt. %. Such a copolymer would hydrolyze to a very limited extent and be of minimal utility in providing degradable products.

SUMMARY OF THE INVENTION

The invention is directed, in part, to a olefin copolymer that is degradable by virtue of being hydrolyzable in the presence of aqueous base or aqueous acid. The copolymer comprises both nonhydrolyzable monomer units and hydrolyzable monomer units, the latter being "hydrolyzable" by virtue of containing at least one linkage that is hydrolytically cleavable under acidic or basic conditions.

In one aspect, the invention provides such a copolymer wherein:

(a) the nonhydrolyzable monomer units result from polymerization of nonhydrolyzable olefin monomers; and (b) the hydrolyzable monomer units result from polymerization of hydrolyzable olefin monomers containing at least one linkage that is hydrolytically cleavable under acidic or basic conditions, wherein the linkage is selected from enol ether, acyclic acetal, hemiacetal, anhydride, carbonate, N-substituted amido, N-substituted urethane, N-substituted imino, imido, substituted imido, N,N-disubstituted hydrazo, thioester, phosphonic ester, sulfonic ester, ortho ester, ether, thio, and siloxyl.

As one example, the nonhydrolyzable monomer units are of the form —$R^1$CH—$CHR^2$—, resulting from copolymerization of a monomer having the structure $R^1CH{=}CHR^2$ in which $R^1$ is hydrido, $C_1$-$C_{24}$ alkyl, substituted $C_1$-$C_{24}$ alkyl, $C_1$-$C_{24}$ heteroalkyl, or substituted $C_1$-$C_{24}$ heteroalkyl, and $R^2$ is hydrido, $C_1$-$C_{24}$ alkyl, substituted $C_1$-$C_{24}$ alkyl, $C_1$-$C_{24}$ heteroalkyl, substituted $C_2$-$C_{24}$ heteroalkyl, $C_2$-$C_{24}$ alkenyl, substituted $C_2$-$C_{24}$ alkenyl, $C_2$-$C_{24}$ heteroalkenyl, substituted $C_2$-$C_{24}$ heteroalkenyl, $C_5$-$C_{24}$ aryl, substituted $C_5$-$C_{24}$ aryl, $C_5$-$C_{24}$ heteroaryl, substituted $C_5$-$C_{24}$ heteroaryl, $C_6$-$C_{24}$ alkaryl, substituted and/or heteroatom-containing $C_6$-$C_{24}$ alkaryl, or halo, or wherein $R^1$ and $R^2$ are linked to form a cyclic group, typically a five- to eight-membered ring (including the two olefinic carbon atoms to which $R^1$ and $R^2$ are directly bound). The second monomer unit is hydrolyzable and of the form —$CHR^3$—$CH_2$-$(L^1)_m$-X-$(L^2)_n$-$CH_2$—$CHR^4$— and results from copolymerization of a monomer having the structure $R^3CH{=}CH$-$(L^1)_m$-X-$(L^2)_n$-$CH{=}CHR^4$ in which $R^3$ and $R^4$ are independently hydrido, $C_1$-$C_{24}$ alkyl, substituted $C_1$-$C_{24}$ alkyl, $C_1$-$C_{24}$ heteroalkyl, substituted $C_1$-$C_{24}$ heteroalkyl, $C_5$-$C_{24}$ aryl, substituted $C_5$-$C_{24}$ aryl, $C_5$-$C_{24}$ heteroaryl, or substituted $C_5$-$C_{24}$ heteroaryl, X is the linkage that is hydrolytically cleavable at an acidic or basic pH, $L^1$ and $L^2$ are optionally substituted and/or heteroatom-containing hydrocarbylene groups, and may contain an additional hydrolytically cleavable linkage, and m and n are independently 0 or 1. The amount of the second monomer unit in the copolymer generally ranges from about 15 mole % to about 75 mole %.

In a related aspect, the invention provides a degradable olefin copolymer prepared by addition polymerization, in the presence of a catalytically effective amount of a transition metal complex and a catalyst activator that renders the complex cationic or zwitterionic, of a monomer mixture containing: at most 80 mole % of at least one nonhydrolyzable monomer of the form $R^1CH{=}CHR^2$, wherein $R^1$ is hydrido or $C_1$-$C_{24}$ alkyl, and $R^2$ is hydrido, alkyl, alkenyl, aryl, alkaryl, or halo, or where $R^1$ and $R^2$ taken together form a hydrocarbylene linkage; and at least 20 mole % of a hydrolyzable monomer of the form $R^3CH{=}CH$-$(L^1)_m$-X-$(L^2)_n$-$CH{=}CHR^4$ wherein $R^3$ and $R^4$ are independently hydrido, alkyl, aryl or substituted aryl, $L^1$ and $L^2$ are optionally substituted and/or heteroatom-containing hydrocarbylene groups, m and n are independently 0 or 1, and X is a hydrolytically cleavable linkage, wherein the transition metal complex is selected from a metallocene complex of a Group 4, 5, or 6 transition metal and a 1,2-diimine complex of a Group 8 transition metal or an analog thereof.

In an exemplary such embodiment, a degradable olefin copolymer is provided that is prepared by addition polymerization, in the presence of a catalytically effective amount of a metallocene complex of a Group 4, 5, or 6 transition metal and a catalyst activator that renders the complex cationic or zwitterionic, of a monomer mixture containing at most 80 mole % of at least one nonhydrolyzable olefin monomer and at least 20 mole % of a diolefin monomer containing a hydrolytically cleavable linkage selected from a cyclic acetal linkage and an ester linkage.

The invention also pertains to a polymer blend that contains at least one degradable olefin copolymer of the invention and at least one additional polymer. The at least one additional polymer may be an additional degradable polymer, e.g., a hydrolytically, photolytically, or enzymatically degradable polymer, and/or a nondegradable polymer. In one embodiment, the blend contains about 5 wt. % to about 99 wt. % of a mixture of degradable polymers and about 1 wt. % to 95 wt. % of a nondegradable polymer, wherein the mixture of degradable polymers is composed of about 30 wt. % to about 95 wt. % of a copolymer of the invention and about 5 wt. % to about 70 wt. % of at least one additional degradable polymer.

In a further aspect, the invention provides a degradable article that at least partially comprises a degradable copolymer composed of at most 80 mole % of nonhydrolyzable monomer units resulting from polymerization of nonhydrolyzable olefin monomers, and at least 20 mole % of hydrolyzable monomer units resulting from polymerization of hydrolyzable olefin monomers containing at least one linkage that is hydrolytically cleavable under acidic or basic conditions. The article is generally selected from films, fibers, foams, woven fabrics, nonwoven fabrics, and molded articles. Examples of specific articles include, without limitation: agricultural film products; adhesive tape substrates; bed linens; containers; coverings, e.g., backsheets and topsheets, for disposable absorbent articles; packaging materials; bags; labels; pillow cases; protective clothing; surgical drapes; sponges; tampon applicators; disposable syringes; temporary enclosures and temporary siding; toys; wipes; foamed plastic products; and controlled release pellets, strips and tabs. Disposable adhesive articles include, without limitation, diapers, sanitary napkins, incontinence pads, pantyliners, and disposable training pants. A preferred degradable copolymer used for the fabrication of these degradable articles is a copolymer of the invention.

DETAILED DESCRIPTION OF THE INVENTION

I. Definitions and Nomenclature

Figure 1:
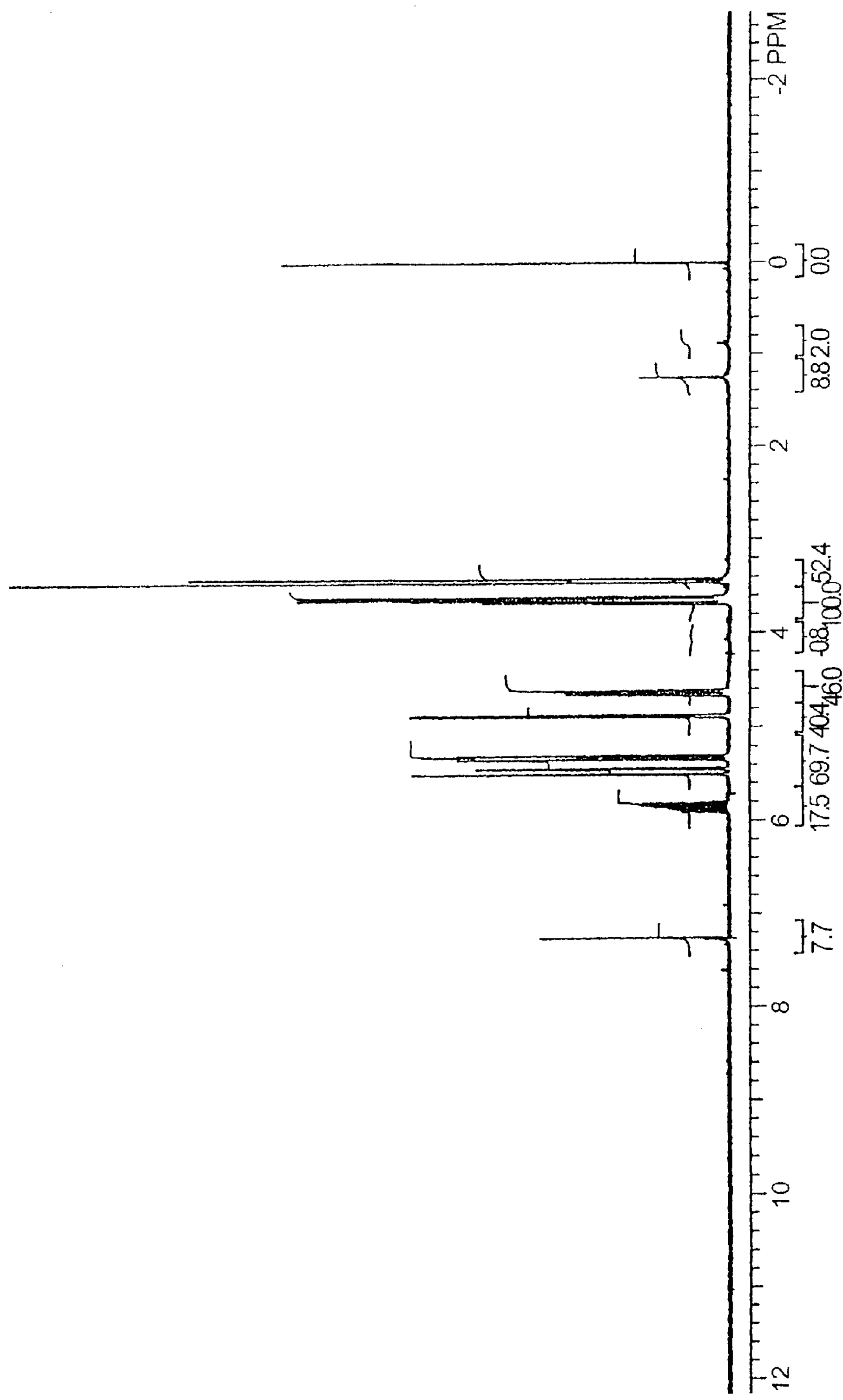
FIGS. 1 and 2 are NMR spectra of 3,9-divinyl-2,4,8,10-tetraoxaspiro[5,5]undecane (a hydrolyzable monomer) and its copolymer with ethylene, respectively, as described in Example 1.

It is to be understood that unless otherwise indicated this invention is not limited to specific reactants, reaction conditions, ligands, metal complexes, or the like, as such may vary. It is also to be understood that the terminology used herein is for the purpose of describing particular embodiments only and is not intended to be limiting. Unless otherwise indicated, this invention is not limited to specific monomers, polymers, catalysts, hydrolysis conditions, or the like, as such may vary. The terminology used herein is for the purpose of describing particular embodiments only and is not intended to be limiting.

As used in the specification and the appended claims, the singular forms "a," "an," and "the" include plural referents unless the context clearly dictates otherwise. Thus, for example, reference to "a monomer" encompasses a combination or mixture of different polymers as well as a single polymer, reference to "a catalyst" encompasses both a single catalyst as well as two or more catalysts used in combination, and the like.

In this specification and in the claims that follow, reference will be made to a number of terms, which shall be defined to have the following meanings:

As used herein, the phrase "having the formula" or "having the structure" is not intended to be limiting and is used in the same way that the term "comprising" is commonly used.

The term "alkyl" as used herein refers to a linear, branched or cyclic saturated hydrocarbon substituent that generally although not necessarily contains 1 to about 24 carbon atoms, such as methyl, ethyl, n-propyl, isopropyl, n-butyl, isobutyl, t-butyl, octyl, decyl, and the like, as well as cycloalkyl groups such as cyclopentyl, cyclohexyl and the like. Generally, although again not necessarily, alkyl groups herein contain 1 to about 12 carbon atoms. The term "lower alkyl" intends an alkyl group of 1 to 6 carbon atoms, preferably 1 to 4 carbon atoms. The term "substituted alkyl" refers to alkyl substituted with one or more substituent groups, i.e., wherein a hydrogen atom is replaced with a non-hydrogen substituent group, and the terms "heteroatom-containing alkyl" and "heteroalkyl" refer to alkyl substituents in which at least one carbon atom is replaced with a heteroatom. If not otherwise indicated, the terms "alkyl" and "lower alkyl" include linear, branched, cyclic, unsubstituted, substituted, and/or heteroatom-containing alkyl and lower alkyl, respectively.

The term "alkylene" as used herein refers to a difunctional linear, branched, or cyclic saturated hydrocarbon linkage, typically although not necessarily containing 1 to about 24 carbon atoms, such as methylene, ethylene, n-propylene, n-butylene, n-hexylene, decylene, tetradecylene, hexadecylene, and the like. Preferred alkylene linkages contain 1 to about 12 carbon atoms, and the term "lower alkylene" refers to an alkylene linkage of 1 to 6 carbon atoms, preferably 1 to 4 carbon atoms. The term "substituted alkylene" refers to an alkylene linkage substituted with one or more substituent groups, i.e., wherein a hydrogen atom is replaced with a non-hydrogen substituent group, and the terms "heteroatom-containing alkylene" and "heteroalkylene" refer to alkylene linkages in which at least one carbon atom is replaced with a heteroatom. If not otherwise indicated, the terms "alkylene" and "lower alkylene" include linear, branched, cyclic, unsubstituted, substituted, and/or heteroatom-containing alkylene and lower alkylene, respectively.

The term "alkenyl" as used herein refers to a linear, branched, or cyclic hydrocarbon group of 2 to about 24 carbon atoms containing at least one double bond, such as ethenyl, n-propenyl, isopropenyl, n-butenyl, isobutenyl, octenyl, decenyl, tetradecenyl, hexadecenyl, eicosenyl, tetracosenyl, and the like. Preferred alkenyl groups herein contain 2 to about 12 carbon atoms. The term "lower alkenyl" intends an alkenyl group of 2 to 6, preferably 2 to 4 carbon atoms, and the specific term "cycloalkenyl" intends a cyclic alkenyl group, preferably having 5 to 8 carbon atoms. The term "substituted alkenyl" refers to alkenyl substituted with one or more substituent groups, and the terms "heteroatom-containing alkenyl" and "heteroalkenyl" refer to alkenyl in which at least one carbon atom is replaced with a heteroatom. If not otherwise indicated, the terms "alkenyl" and "lower alkenyl" include linear, branched, cyclic, unsubstituted, substituted, and/or heteroatom-containing alkenyl and lower alkenyl, respectively.

The term "alkenylene" as used herein refers to a difunctional linear, branched, or cyclic alkenyl group, where "alkenyl" is as defined above. The term "alkenylene" as used herein refers to a difunctional linear, branched, or cyclic hydrocarbon linkage containing at least one carbon-carbon double bond, typically although not necessarily containing 2 to about 24 carbon atoms, such as ethylene, n-propylene, n-butylene, n-hexylene, decylene, tetradecylene, hexadecylene, and the like. Preferred alkenylene linkages contain 2 to about 12 carbon atoms, and the term "lower alkenylene" refers to an alkenylene linkage of 2 to 6 carbon atoms, preferably 2 to 4 carbon atoms. The term "substituted alkenylene" refers to an alkenylene linkage substituted with one or more substituent groups, i.e., wherein a hydrogen atom is replaced with a non-hydrogen substituent group, and the terms "heteroatom-containing alkenylene" and "heteroalkenylene" refer to alkenylene linkages in which at least one carbon atom is replaced with a heteroatom. If not otherwise indicated, the terms "alkenylene" and "lower alkenylene" include linear, branched, cyclic, unsubstituted, substituted, and/or heteroatom-containing alkenylene and lower alkenylene, respectively.

The term "alkoxy" as used herein refers to an alkyl group bound through a single, terminal ether linkage; that is, an "alkoxy" group may be represented as —O-alkyl where alkyl is as defined above. A "lower alkoxy" group refers to an alkoxy group containing 1 to 6 carbon atoms, preferably 1 to 4 carbon atoms, and includes, for example, methoxy, ethoxy, n-propoxy, isopropoxy, t-butyloxy, etc. If not otherwise indicated, the terms "alkoxy" and "lower alkoxy" include linear, branched, cyclic, unsubstituted, substituted, and/or heteroatom-containing alkoxy and lower alkoxy groups, respectively.

The term "aryl" as used herein, and unless otherwise specified, refers to an aromatic substituent containing a single aromatic ring or multiple aromatic rings that are fused together, directly linked, or indirectly linked (such that the different aromatic rings are bound to a common group such as a methylene or ethylene moiety). Preferred aryl groups contain 5 to 24 carbon atoms and either one aromatic ring or 2 to 4 fused or linked aromatic rings, e.g., phenyl, naphthyl, biphenyl, and the like, with more preferred aryl groups containing 1 to 3 aromatic rings, and particularly preferred aryl groups containing 1 or 2 aromatic rings and 5 to 14 carbon atoms. "Substituted aryl" refers to an aryl moiety substituted with one or more substituent groups, and the terms "heteroatom-containing aryl" and "heteroaryl" refer to an aryl group in which at least one ring carbon atom is replaced with a heteroatom. Unless otherwise indicated, the term "aryl" includes substituted and/or heteroaryl species.

The term "aryloxy" as used herein refers to an aryl group bound through a single, terminal ether linkage, wherein "aryl" is as defined above. An "aryloxy" group may be represented as —O-aryl where aryl is as defined above. Preferred aryloxy groups contain 5 to 24 carbon atoms, and particularly preferred aryloxy groups contain 5 to 14 carbon atoms. Examples of aryloxy groups include, without limitation, phenoxy, o-halo-phenoxy, m-halo-phenoxy, p-halo-phenoxy, o-methoxy-phenoxy, m-methoxy-phenoxy, p-methoxy-phenoxy, 2,4-dimethoxy-phenoxy, 3,4,5-trimethoxy-phenoxy, and the like.

The term "alkaryl" refers to an aryl group with an alkyl substituent, and the term "aralkyl" refers to an alkyl group with an aryl substituent, wherein "aryl" and "alkyl" are as defined above. Preferred aralkyl groups contain 6 to 24 carbon atoms, and particularly preferred aralkyl groups contain 6 to 16 carbon atoms. Examples of aralkyl groups include, without limitation, benzyl, 2-phenyl-ethyl, 3-phenyl-propyl, 4-phenyl-butyl, 5-phenyl-pentyl, 4-phenylcyclohexyl, 4-benzylcyclohexyl, 4-phenylcyclohexylmethyl, 4-benzylcyclohexylmethyl, and the like. Alkaryl groups include, for example, p-methylphenyl, 2,4-dimethylphenyl, p-cyclohexylphenyl, 2,7-dimethylnaphthyl, 7-cyclooctylnaphthyl, 3-ethyl-cyclopenta-1,4-dienyl, and the like.

The term "halo" is used in the conventional sense to refer to a chloro, bromo, fluoro or iodo substituent.

"Hydrocarbyl" refers to univalent hydrocarbyl radicals containing 1 to about 24 carbon atoms, most preferably 1 to about 12 carbon atoms, including linear, branched, cyclic, saturated and unsaturated species, such as alkyl groups, alkenyl groups, aryl groups, and the like. The term "lower hydrocarbyl" intends a hydrocarbyl group of 1 to 6 carbon atoms, preferably 1 to 4 carbon atoms. The term "hydrocarbylene" intends a divalent hydrocarbyl moiety containing 1 to about 24 carbon atoms, most preferably 1 to about 12 carbon atoms, including linear, branched, cyclic, saturated and unsaturated species, and the term "lower hydrocarbylene" intends a hydrocarbylene group of 1 to 6 carbon atoms, preferably 1 to 4 carbon atoms. The term "substituted hydrocarbyl" refers to hydrocarbyl substituted with one or more substituent groups, and the terms "heteroatom-containing hydrocarbyl" and "heterohydrocarbyl" refer to hydrocarbyl in which at least one carbon atom is replaced with a heteroatom. Similarly, "substituted hydrocarbylene" refers to hydrocarbylene substituted with one or more substituent groups, and the terms "heteroatom-containing hydrocarbylene" and "heterohydrocarbylene" refer to hydrocarbylene in which at least one carbon atom is replaced with a heteroatom. Unless otherwise indicated, the terms "hydrocarbyl" and "hydrocarbylene" are to be interpreted as including substituted and/or heteroatom-containing hydrocarbyl and hydrocarbylene moieties, respectively.

The term "heteroatom-containing" as in a "heteroatom-containing hydrocarbyl group" refers to a hydrocarbon molecule or a hydrocarbyl molecular fragment in which one or more carbon atoms is replaced with an atom other than carbon, e.g., nitrogen, oxygen, sulfur, phosphorus or silicon, typically nitrogen, oxygen or sulfur. Similarly, the term "heteroalkyl" refers to an alkyl substituent that is heteroatom-containing, the term "heterocyclic" refers to a cyclic substituent that is heteroatom-containing, the terms "heteroaryl" and heteroaromatic" respectively refer to "aryl" and "aromatic" substituents that are heteroatom-containing, and the like. It should be noted that a "heterocyclic" group or compound may or may not be aromatic, and further that "heterocycles" may be monocyclic, bicyclic, or polycyclic as described above with respect to the term "aryl."

By "substituted" as in "substituted alkyl," "substituted aryl," and the like, as alluded to in some of the aforementioned definitions, is meant that in the alkyl, aryl, or other moiety, at least one hydrogen atom bound to a carbon (or other) atom is replaced with one or more non-hydrogen substituents. Examples of such substituents include, without limitation: functional groups such as halo, hydroxyl, sulfhydryl, $C_1$-$C_{24}$ alkoxy (preferably $C_1$-$C_{12}$ alkoxy, more preferably $C_1$-$C_6$ alkoxy), $C_5$-$C_{24}$ aryloxy (preferably $C_5$-$C_{14}$ aryloxy), acyl (including $C_2$-$C_{24}$ alkylcarbonyl (—CO-alkyl) and $C_6$-$C_{24}$ arylcarbonyl (—CO-aryl), preferably $C_2$-$C_{12}$ alkylcarbonyl and $C_6$-$C_{16}$ arylcarbonyl, and most preferably $C_2$-$C_6$ alkylcarbonyl), acyloxy (—O-acyl), $C_2$-$C_{24}$, preferably $C_2$-$C_{12}$, and most preferably $C_2$-$C_6$ alkoxycarbonyl (—(CO)—O-alkyl), $C_6$-$C_{24}$, preferably $C_6$-$C_{14}$ aryloxycarbonyl (—(CO)—O-aryl), halocarbonyl (—(CO)—X where X is halo), carboxy (—COOH), carboxylato ($—COO^-$), carbamoyl (—(CO)—$NH_2$), mono-($C_1$-$C_{24}$, preferably $C_1$-$C_{12}$ alkyl, most preferably $C_1$-$C_6$ alkyl)-substituted carbamoyl (—(CO)—NH(alkyl)), di-($C_1$-$C_{24}$, preferably $C_1$-$C_{12}$ dialkyl, most preferably $C_1$-$C_6$ dialkyl)-substituted carbamoyl (—(CO)—N(alkyl)$_2$), mono-($C_5$-$C_{24}$, preferably $C_5$-$C_{14}$ aryl)-substituted carbamoyl (—(CO)—NH-aryl), di-($C_5$-$C_{24}$, preferably $C_5$-$C_{14}$ aryl)-substituted carbamoyl (—(CO)—N(aryl)$_2$), di-N—($C_1$-$C_{24}$, preferably $C_1$-$C_{12}$ alkyl, most preferably $C_1$-$C_6$ alkyl), N—($C_5$-$C_{24}$, preferably $C_5$-$C_{14}$ aryl)-substituted carbamoyl, thiocarbamoyl (—(CS)—$NH_2$), carbamido (—NH—(CO)—$NH_2$), formyl (—(CO)—H), thioformyl (—(CS)—H), amino (—$NH_2$), mono-($C_1$-$C_{24}$, preferably $C_1$-$C_{12}$ alkyl, most preferably $C_1$-$C_6$ alkyl)-substituted amino, di-($C_1$-$C_{24}$, preferably $C_1$-$C_{12}$ alkyl, most preferably $C_1$-$C_6$ alkyl)-substituted amino, mono-($C_5$-$C_{24}$, preferably $C_5$-$C_{14}$ aryl)-substituted amino, di-($C_5$-$C_{24}$, preferably $C_5$-$C_{14}$ aryl)-substituted amino, $C_2$-$C_{24}$, preferably $C_2$-$C_{12}$, most preferably $C_2$-$C_6$ alkylamido (—NH—(CO)-alkyl), $C_5$-$C_{24}$, preferably $C_5$-$C_{14}$ arylamido (—NH—(CO)-aryl), nitro (—$NO_2$), sulfo (—$SO_2$—OH), sulfonato (—$SO_2$—$O^-$), $C_1$-$C_{24}$, preferably $C_1$-$C_{12}$, most preferably $C_1$-$C_6$ alkylsulfanyl (—S-alkyl; also termed "alkylthio"), arylsulfanyl (—S-aryl; also termed "arylthio"), $C_1$-$C_{24}$, preferably $C_1$-$C_{12}$, most preferably $C_1$-$C_6$ alkylsulfinyl (—(SO)-alkyl), $C_5$-$C_{24}$, preferably $C_5$-$C_{14}$ arylsulfinyl (—(SO)-aryl), $C_1$-$C_{24}$, preferably $C_1$-$C_{12}$, most preferably $C_1$-$C_6$ alkylsulfonyl (—$SO_2$-alkyl), $C_5$-$C_{24}$, preferably $C_5$-$C_{14}$ arylsulfonyl (—$SO_2$-aryl), phosphono (—P(O)(OH)$_2$), phosphonato (—P(O)($O^-$)$_2$), di($C_1$-$C_{24}$, preferably $C_1$-$C_{12}$, most preferably $C_1$-$C_6$)-alkyl phosphonyl (—P(O)(O-alkyl)$_2$), di($C_5$-$C_{24}$, preferably $C_5$-$C_{14}$)-aryl phosphonyl (—P(O)(O-aryl)$_2$), phosphinato (—P(O)($O^-$)), $C_1$-$C_{24}$, preferably $C_1$-$C_{12}$, most preferably $C_1$-$C_6$ alkyl phosphinyl (—P(O)(O-alkyl)), $C_5$-$C_{24}$, preferably $C_5$-$C_{14}$ arylphosphinyl (—P(O)(O-aryl)), phospho (—$PO_2$), and phosphino (—$PH_2$); and the hydrocarbyl moieties $C_1$-$C_{24}$ alkyl (preferably $C_1$-$C_{12}$ alkyl, more preferably $C_1$-$C_6$ alkyl), $C_2$-$C_{24}$ alkenyl (preferably $C_2$-$C_{13}$ alkenyl, more preferably $C_2$-$C_6$ alkenyl), $C_2$-$C_{24}$ alkynyl (preferably $C_2$-$C_{12}$ alkynyl, more preferably $C_2$-$C_6$ alkynyl), $C_5$-$C_{24}$ aryl (preferably $C_5$-$C_{14}$ aryl), $C_6$-$C_{24}$ alkaryl (preferably $C_6$-$C_{16}$ alkaryl), and $C_6$-$C_{24}$ aralkyl (preferably $C_6$-$C_{16}$ aralkyl).

In addition, the aforementioned functional groups may, if a particular group permits, be further substituted with one or more additional functional groups or with one or more hydrocarbyl moieties such as those specifically enumerated above. Analogously, the above-mentioned hydrocarbyl moieties may be further substituted with one or more functional groups or additional hydrocarbyl moieties such as those specifically enumerated.

When the term "substituted" appears prior to a list of possible substituted groups, it is intended that the term apply to every member of that group. For example, the phrase "substituted alkyl, alkenyl, and aryl" is to be interpreted as "substituted alkyl, substituted alkenyl, and substituted aryl." Analogously, when the term "heteroatom-containing" appears prior to a list of possible heteroatom-containing groups, it is intended that the term apply to every member of that group. For example, the phrase "heteroatom-containing alkyl, alkenyl, and aryl" is to be interpreted as "heteroatom-containing alkyl, substituted alkenyl, and substituted aryl."

The term "comonomer" in an addition polymerization refers to the hydrolyzable comonomer, unless otherwise indicated.

A "diene comonomer" is incorporated as a "chain extender" when both double bonds are incorporated into the polymer backbone in a linear fashion, as opposed to incorporation as a crosslinker, wherein the two double bonds are incorporated into separate polymer chains.

The term "degradable" refers to a molecular segment, copolymer, or product that can be degraded by acid or base hydrolysis, by virtue of a hydrolytically cleavable linkage in the molecular segment, the copolymer, or in a copolymer incorporated into the product.

The term "hydrolyzable" refers to a compound or molecular segment (e.g., a monomer or monomer unit) containing a covalent chemical linkage between two atoms that is hydrolytically cleavable at an acidic or basic pH. It will be appreciated that a different pH will be necessary for different types of compounds, and that certain compounds and linkages are hydrolytically cleavable at a pH that is close to neutral (7.0) while other compounds and linkages may require a higher or lower pH for hydrolytic cleavage. As the present copolymers are intended for use in degradable products that are ultimately subject to waste disposal processing, including recycling, hydrolysis may be ensured by carrying out any post-disposal processing at a pH known to enable hydrolytic cleavage. If the products are disposed of in conventional ways not involving processing, they will hydrolyze as a result of natural variations in environmental pH. Additionally, the consumer may facilitate hydrolysis of certain types of products, e.g., by disposing of a diaper, sanitary napkin, incontinence pad, pantyliner, tampon, or the like, in a toilet and adding a pH-adjusting compound to the water prior to flushing. Preferred hydrolyzable linkages herein are base cleavable.

Conversely, "nonhydrolyzable" refers to a compound or molecular segment (e.g., a monomer or monomer unit) not containing a covalent chemical linkage between two atoms that is hydrolytically cleavable at an acidic or basic pH.

A "heterogeneous" catalyst as used herein refers to a catalyst supported on a carrier, typically although not necessarily a substrate comprised of an inorganic, solid, particulate porous material such as silicon and/or aluminum oxide.

A "homogeneous" catalyst as used herein refers to a catalyst that is not supported but is simply admixed with the initial monomeric components in a suitable solvent.

"Optional" or "optionally" means that the subsequently described circumstance may or may not occur, so that the description includes instances where the circumstance occurs and instances where it does not. For example, the phrase "optionally substituted" means that a non-hydrogen substituent may or may not be present on a given atom, and, thus, the description includes structures wherein a non-hydrogen substituent is present and structures wherein a non-hydrogen substituent is not present.

II. Degradable Olefin Copolymers

The present polymers may be used in a host of applications in which degradability, particularly hydrolyzability, is desirable or necessary. Potential applications are discussed in detail infra, in section IV.

The subject copolymers are hydrolytically degradable olefin copolymers without adjacent hydrolyzable monomers, comprising a first monomer unit that is not hydrolyzable and a second monomer unit that is hydrolyzable.

The first monomer unit derives from a first addition polymerizable monomer of the form $CHR^1{=}CHR^2$, wherein $R^1$ is hydrido, $C_1$-$C_{24}$ alkyl, substituted $C_1$-$C_{24}$ alkyl, $C_1$-$C_{24}$ heteroalkyl, or substituted $C_1$-$C_{24}$ heteroalkyl, preferably hydrido or $C_1$-$C_{12}$ alkyl, most preferably hydrido or lower alkyl, and $R^2$ is hydrido, $C_1$-$C_{24}$ alkyl, substituted $C_1$-$C_{24}$ alkyl, $C_1$-$C_{24}$ heteroalkyl, substituted $C_1$-$C_{24}$ heteroalkyl, $C_2$-$C_{24}$ alkenyl, substituted $C_2$-$C_{24}$ alkenyl, $C_2$-$C_{24}$ heteroalkenyl, substituted $C_2$-$C_{24}$ heteroalkenyl, $C_5$-$C_{24}$ aryl, substituted $C_5$-$C_{24}$ aryl, $C_5$-$C_{24}$ heteroaryl, substituted $C_5$-$C_{24}$ heteroaryl, $C_6$-$C_{24}$ alkaryl, substituted and/or heteroatom-containing $C_6$-$C_{24}$ alkaryl, or halo, preferably hydrido, $C_1$-$C_{12}$ alkyl, substituted $C_1$-$C_{12}$ alkyl, $C_1$-$C_{12}$ heteroalkyl, substituted $C_1$-$C_{12}$ heteroalkenyl, $C_2$-$C_{12}$ alkenyl, substituted $C_2$-$C_{12}$ alkenyl, $C_2$-$C_{12}$ heteroalkenyl, substituted $C_2$-$C_{12}$ heteroalkenyl, $C_5$-$C_{14}$ aryl, substituted $C_5$-$C_{14}$ aryl, $C_5$-$C_{14}$ heteroaryl, substituted $C_5$-$C_{14}$ heteroaryl, $C_6$-$C_{16}$ alkaryl, substituted and/or heteroatom-containing $C_6$-$C_{16}$ alkaryl, or halo, most preferably hydrido, lower alkyl, substituted lower alkyl, lower heteroalkyl, substituted lower heteroalkyl, $C_5$-$C_{14}$ aryl, substituted $C_5$-$C_{14}$ aryl, $C_5$-$C_{14}$ heteroaryl, substituted $C_5$-$C_{14}$ heteroaryl, $C_6$-$C_{16}$ alkaryl, substituted and/or heteroatom-containing $C_6$-$C_{16}$ alkaryl, or halo, or wherein $R^1$ and $R^2$ are linked to form a cyclic group, typically a five- to eight-membered ring (including the two olefinic carbon atoms to which $R^1$ and $R^2$ are directly bound). In such a case, the two olefinic carbon atoms will be linked through a bridge -Q- wherein Q is hydrocarbylene and provides a three-atom to seven-atom spacer, wherein Q is optionally substituted with one or more substituents such as alkyl, aryl, alkoxy, halo, or the like, and/or containing one or more heteroatoms such as O, S, or N.

Examples of such monomers include olefins having from about 2 to about 20 carbon atoms, such as linear or branched olefins including ethylene, propylene, 1-butene, 3-methyl-1-butene, 1,3-butadiene, 1-pentene, 4-methyl-1-pentene, 1-hexene, 4-methyl-1-hexene, 1,4-hexadiene, 1,5-hexadiene, 1-octene, 1,6-octadiene, 1-nonene, 1-decene, 1,4-dodecadiene, 1-hexadecene, 1-octadecene, and mixtures thereof. Cyclic olefins, diolefins, triolefins, tetraolefins, etc., may also be used; such compounds include, for example, cyclopentene, 3-vinylcyclohexene, norbornene, 5-vinyl-2-norbornene, 5-ethylidene-2-norbornene, dicyclopentadiene, 4-vinylbenzocyclobutane, tetracyclododecene, dimethano-octahydronaphthalene, and 7-octenyl-9-borabicyclo-(3,3,1)

nonane. Aromatic olefinic and vinyl monomers that may be polymerized using the present method include, but are not necessarily limited to, styrene, o-methylstyrene, m-methylstyrene, p-methylstyrene, p-tert-butylstyrene, m-chlorostyrene, p-chlorostyrene, p-fluorostyrene, indene, 4-vinylbiphenyl, acenaphthalene, vinylfluorene, vinylanthracene, vinylphenanthrene, vinylpyrene and vinylchrisene. Still other monomers that may be polymerized within the context of the present method include methyl methacrylate, ethylacrylate, vinyl silane, phenyl silane, trimethylallyl silane, acrylonitrile, maleimide, vinyl chloride, vinylidene chloride, tetrafluoroethylene, isobutylene, carbon monoxide, acrylic acid, 2-ethylhexylacrylate, methacrylonitrile, and methacrylic acid.

The second monomer unit derives from monomers having the structure $CHR^3{=}CH\text{-}(L^1)_m\text{-}X\text{-}(L^2)_n\text{-}CH{=}CHR^4$ wherein $R^3$, $R^4$, $L^1$, $L^2$, m, n and X are as defined below.

$R^3$ and $R^4$ are independently hydrido, $C_1$-$C_{24}$ alkyl, substituted $C_1$-$C_{24}$ alkyl, $C_1$-$C_{24}$ heteroalkyl, substituted $C_1$-$C_{24}$ heteroalkyl, $C_5$-$C_{24}$ aryl, substituted $C_5$-$C_{24}$ aryl, $C_5$-$C_{24}$ heteroaryl, or substituted $C_5$-$C_{24}$ heteroaryl, preferably hydrido, $C_1$-$C_{12}$ alkyl, substituted $C_1$-$C_{12}$ alkyl, $C_1$-$C_{12}$ heteroalkyl, substituted $C_1$-$C_{12}$ heteroalkyl, $C_5$-$C_{14}$ aryl, substituted $C_5$-$C_{14}$ aryl, $C_5$-$C_{14}$ heteroaryl, or substituted $C_5$-$C_{14}$ heteroaryl, more preferably hydrido or lower alkyl, still more preferably hydrido or methyl, and most preferably hydrido.

$L^1$ and $L^2$ are optionally substituted and/or heteroatom-containing hydrocarbylene groups, e.g., $C_1$-$C_{24}$ alkylene, substituted $C_1$-$C_{24}$ alkylene, $C_1$-$C_{24}$ heteroalkylene, substituted $C_1$-$C_{24}$ heteroalkylene, $C_2$-$C_{24}$ alkenylene, substituted $C_2$-$C_{24}$ alkenylene, $C_2$-$C_{24}$ heteroalkenylene, or substituted $C_2$-$C_{24}$ heteroalkenylene, preferably $C_1$-$C_{12}$ alkylene, substituted $C_1$-$C_{12}$ alkylene, $C_2$-$C_{12}$ heteroalkylene, or substituted $C_2$-$C_{12}$ heteroalkylene, most preferably substituted or unsubstituted lower alkylene, and optimally unsubstituted lower alkylene. $L^1$ and/or $L^2$ may also contain a hydrolytically cleavable linkage as explained below with respect to X. Further, when $L^1$ and/or $L^2$ is substituted, the substituent may be an alkenyl group, e.g., a substituted or unsubstituted allyl moiety, and more than one such substituent can be present on each of $L^1$ and $L^2$. Thus, the hydrolyzable monomer may be a polyolefin, e.g., a triolefin or tetraolefin. One representative such monomer is tetraallyloxysilane, The subscripts m and n are independently 0 or 1, such that $L^1$ and $L^2$ may or may not be present.

X is a linkage that is hydrolytically cleavable under aqueous conditions, generally at acidic or basic pH. To prevent deactivation of the polymerization catalyst, X does not include a group containing an active hydrogen atom, e.g., a hydroxyl group, a primary or secondary amino group, or a thiol group, nor does it contain any group that could oxidize the metal center of the catalyst. Preferred X linkages include, but are not limited to, the following:

carboxylate ester (—(CO)—O—);

enol ether (—CH═CH—O—);

acetal (—O—$CR_2$—O—);

hemiacetal (—CH(OH)—O—);

anhydride (—(CO)—O—(CO)—);

carbonate (—O—(CO)—O);

N-substituted amide (—(CO)—NR—);

N-substituted urethane (—O—(CO)—NR—);

N-substituted imino (—$CH_2$—NR—, —CHR—NR—, (—$CR_2$—NR—);

imido (—CH═N—);

substituted imido (—CR═N—);

lactam (-$Cy^1$(═O)— where $Cy^1$ is a three- to seven, typically a five- or six-membered nitrogen containing heterocycle, e.g., pyrrolidone);

cyclic imido (-$Cy^2$- where $Cy^2$ is a five- or six-membered ring containing a —CH═N— linkage);

substituted cyclic imido (substituted -$Cy^2$- where $Cy^2$ is a five- or six-membered ring containing a —CR═N— linkage);

N,N-disubstituted hydrazo (—NR—NR—);

bicyclic acetal (-$Cy^3Cy^4$- wherein $Cy^3$ and $Cy^4$ are five- or six-membered rings each containing an acetal linkage);

thioester (—(CO)—S—);

phosphonic ester (—P(O)(OR)—O—);

sulfonic ester (—$SO_2$—OR—);

ortho ester (—$C(OR)_2$—O—);

ether (—O—), including cyclic ether;

thio (—S—);

dithio (—S—S—); and siloxyl (—SiR'R"—O—SiR'R"— or —O—SiR'R"—O—); and silazyl (—SiR'R"—NR—SiR'R"— or —NR—SiR'R"—NR—).

In the above structures, R is hydrocarbyl (e.g., $C_1$-$C_{24}$ alkyl, $C_5$-$C_{24}$ aryl, $C_6$-$C_{24}$ alkaryl, or $C_6$-$C_{24}$ aralkyl, preferably $C_1$-$C_{12}$ alkyl, $C_5$-$C_{14}$ aryl, $C_6$-$C_{16}$ alkaryl, or $C_6$-$C_{16}$ aralkyl, more preferably $C_1$-$C_6$ alkyl), substituted hydrocarbyl (e.g., substituted $C_1$-$C_{24}$ alkyl, $C_5$-$C_{24}$ aryl, $C_6$-$C_{24}$ alkaryl, or $C_6$-$C_{24}$ aralkyl, preferably substituted $C_1$-$C_{12}$ alkyl, $C_5$-$C_{14}$ aryl, $C_6$-$C_{16}$ alkaryl, or $C_6$-$C_{16}$ aralkyl, more preferably substituted $C_1$-$C_6$ alkyl), heteroatom-containing hydrocarbyl (e.g., $C_1$-$C_{24}$ heteroalkyl, $C_5$-$C_{24}$ heteroaryl, $C_6$-$C_{24}$ heteroalkaryl, or $C_6$-$C_{24}$ heteroaralkyl, preferably $C_1$-$C_{12}$ heteroalkyl, $C_5$-$C_{14}$ heteroaryl, $C_6$-$C_{16}$ heteroalkaryl, or $C_6$-$C_{16}$ heteroaralkyl, more preferably $C_1$-$C_6$ heteroalkyl), or s (e.g., substituted $C_1$-$C_{24}$ heteroalkyl, $C_5$-$C_{24}$ heteroaryl, $C_6$-$C_{24}$ heteroalkaryl, or $C_6$-$C_{24}$ heteroaralkyl, preferably substituted $C_1$-$C_{12}$ heteroalkyl, $C_5$-$C_{14}$ heteroaryl, $C_6$-$C_{16}$ heteroalkaryl, or $C_6$-$C_{16}$ heteroaralkyl, more preferably substituted $C_1$-$C_6$ heteroalkyl). Optimally, R is lower alkyl. In the siloxyl and silazyl linkages, R' and R" are independently selected from hydrido, hydrocarbyl as defined above, and alkoxy, and are preferably hydrido, lower alkyl, or lower alkoxy.

Exemplary hydrolyzable monomers thus include, but are not limited to:

esters having the structure

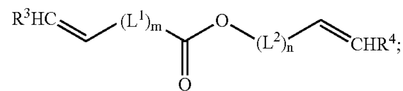

enol ethers having the structure

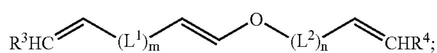

acetals having the structure

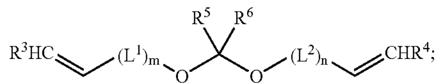

hemiacetals having the structure

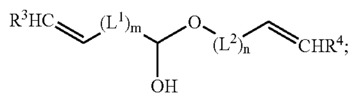

anhydrides having the structure

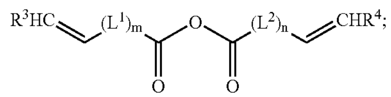

cyclic diketals having the structure

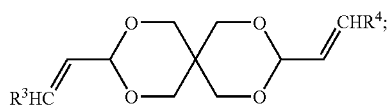

siloxanes having the structure

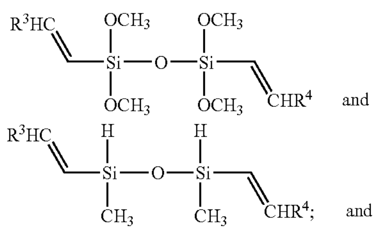

imides having the structure

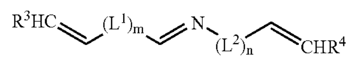

wherein $R^3$, $R^4$, $L^1$, $L^2$, m and n are as defined previously, and $R^5$ and $R^6$ are independently hydrido or alkyl, preferably hydrido or lower alkyl, most preferably hydrido.

As noted previously, $L^1$ and $L^2$ can also contain a hydrolytically cleavable linkage. A representative monomer in which this is the case is the diester having the structure

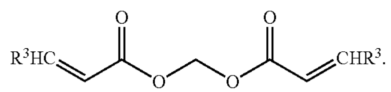

It will be appreciated that this compound corresponds to a monomer of structure $R^3CH{=}CH\text{-}(L^1)_m\text{-}X\text{-}(L^2)_n\text{-}CH{=}CHR^4$ in which m is 0, X is —(CO)—O—, n is 1, and $L^2$ is $—CH_2—O—(CO)—$).

The copolymers are formed by polymerization, catalyzed by a soluble transition metal catalyst, as described further below. The molecular weight of the copolymer is sufficient to provide the physical properties required for the final use of the copolymer, e.g., in packaging, disposable containers, disposable diapers, etc. For example, the molecular weight (weight average) of a polyethylene copolymer will generally be in the range of about 20,000 to about 300,000 or greater (preferably in the range of about 60,000 to 300,000), an approximate useful range for commercial linear polyethylenes.

The hydrolyzable component of the copolymer is found within the second monomer unit, $—CHR^3—CH_2\text{-}(L^1)_m\text{-}X\text{-}(L^2)_n\text{-}CH_2—CHR^4—$, incorporated within the backbone of the copolymer wherein $R^3$, $R^4$, $L^1$, $L^2$, m and n are as defined above. Accordingly, the copolymer is degraded at the linkage X under aqueous conditions, generally involving acidic or basic hydrolysis, thus breaking a copolymer into lower molecular weight segments. Depending on the nature of X, these lower molecular weight segments typically have polar end groups, thus increasing the water solubility, or dispersability, of the fragments.

To increase the effectiveness of the hydrolyzable comonomer in degradation of the copolymer, the copolymer has no adjacent hydrolyzable monomer units and none would be expected to occur in the polymerizations described herein. It will be appreciated that copolymers having a higher ratio of hydrolyzable comonomer to olefinic monomer will undergo a greater reduction in average molecular weight on degradation. Higher levels of hydrolyzable comonomer will also generally have a greater effect on the physical properties, such as the hydrophobicity, of the copolymer, and are expected to reduce degree of polymerization (i.e., molecular weight) as well. Therefore, the desired fraction of hydrolyzable comonomer units in the copolymer will depend on the final use, and desired extent of degradability, of the copolymer. A significant advantage of the invention, however, is that a far greater proportion of the hydrolyzable monomer in the monomer mixture undergoing polymerization can now be incorporated into the resulting copolymer. That is, on the order of 50 mole % to 100 mole %, preferably about 60 mole % to 100 mole %, and most preferably about 70 mole % to 100 mole % of the total hydrolyzable monomer in the feed is actually incorporated into the copolymer.

As a general matter, the method of the invention enables the preparation of copolymers containing at least 10 mole %, or at least 15 mole %, or at least 20 mole %, or at least 25 mole %, hydrolyzable monomer units, and up to 50 mole % or more. For most applications, however, the copolymer will contain about 0.1 mole % to about 50 mole % hydrolyzable monomer units (corresponding to a 99.9:1 to 1:1 mole ratio of nonhydrolyzable monomer units to hydrolyzable monomer units).

III. Polymerization

The copolymers are prepared by transition metal-catalyzed polymerization, a preferred method for forming olefin copolymers with good control of molecular weight, molecular weight distribution, and stereoregularity. Procedures for such polymerizations are well known in the art.

In general, the present polymers are prepared using soluble transition metal catalysts. Such catalysts include metallocenes, preferably those derived from Group 4, 5, and 6 transition metals, typically Ti, Hf, or Zr, although complexes of V, Nb and Mo are also employed. These complexes include at least one ligand derived from a cyclopentadiene ring, or a multiring system containing a cyclopentadiene ring, such as fluorene or indene. The ring or ring system may be substituted with alkyl, aryl, or other groups not containing active hydrogen, such as ethers, tertiary amines, tertiary boranes, tertiary silanes, or halides. Other ligands on the transition metal are typically halides, lower alkyl groups, or tertiary amines, but may also be selected from a wide variety of other groups, such as aryl, alkoxy, acetoacetate, carbonyl, nitrile, isonitrile, tertiary amine or phosphine, B-allyl, or cyclic unsaturated hydrocarbons such as cycloheptatriene. Two of the ligands may be bridged, e.g., by a chain containing linkages selected from alkyl and alkylsilane, to formed constrained-geometry catalysts. Examples of metallocene catalysts include cyclopentadienyl titanium trichloride, bis(cyclopentadienyl)zirconium dichloride, bis(cyclopentadienyl)dimethyl zirconium, (pentamethylcyclopentadienyl)titanium trimethoxide, bis-2-(3,5-di(trifluoromethyl)phenyl)-indenyl hafnium dichloride, (3,5-di(trifluoromethyl)phenyl)indenyl hafnium trichloride, and bridged compounds such as dimethylsilylbis(cyclopentadienyl)hafnium dichloride, dimethylsilylbis(2-methyl-4-phenyl indenyl)zirconium dichloride, and (tert-burylamido) dimethyl (cyclopentadienyl)silane zirconium dichloride. Other suitable metallocene catalysts include those described in U.S. Pat. Nos. 6,048,992 and 6,369,253 to Wilson Jr. et al., both of which are assigned to SRI International (Menlo Park, Calif.).

Also useful are Brookhart-type catalysts, based on 1,2-diimine complexes of Group 8 transition metals, particularly Ni, Pd, Fe, and Co; Cu, Ag, and Au complexes have also been described. These catalysts are typically transition metal complexes having the structure

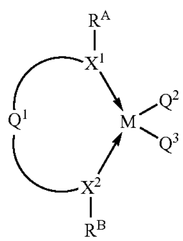

wherein M is generally selected from Pd(II), Fe(II), Co(II), and Ni(II), $X^1$ and $X^2$ are heteroatoms, generally N, $R^A$ and $R^B$ are hydrocarbyl, optionally substituted and/or heteroatom-containing, $Q^1$ is a hydrocarbylene linkage, optionally substituted and/or heteroatom-containing, $Q^2$ and $Q^3$ are each a univalent radical such as hydride, halide, lower alkyl, or lower alkoxy. Often, one or more cyclic groups are present, for example, when $R^A$ and/or $R^B$ are linked to an atom contained within the linkage $Q^1$ (to form an N-heterocycle when $X^1$ and/or $X^2$ are N), or when two or more substituents on adjacent atoms within $Q^1$ are linked. See, for example, Johnson et al. (1995), supra, Johnson et al. (1996) *J. Am. Chem. Soc.* 118:267-8, and Killian et al. (19979) *Organometallics* 16:2005-7. Related cobalt- and iron-based catalysts employ tridentate imine ligands (Small et al. (1998) *J. Am. Chem. Soc.* 120:4049-50). Other complexes may be used having imine-containing ligands other than diimines, or analogous pyridyl-containing or bipyridyl ligands. Other suitable Brookhart-type catalysts and analogs thereof are described in U.S. Pat. No. 6,355,746 to Tagge et al.

In carrying out the present polymerization reaction, the transition metal complexes described herein as polymerization catalysts are preferably, although not necessarily, used in conjunction with a catalyst activator that converts the electronically neutral metal center of the complex to a cation, such that the complex is rendered cationic or zwitterionic. Thus, it is preferred that prior to or upon polymerization, the transition metal complex selected as the polymerization catalyst is incorporated into a catalyst system that includes such an activator. Suitable catalyst activators are those that are typically referred to as ionic cocatalysts; such compounds include, for example, include metal alkyls, hydrides, alkylhydrides, and alkylhalides, such as alkyllithium compounds, dialkylzinc compounds, trialkyl boron compounds, trialkylaluminum compounds, alkylaluminum halides and hydrides, and tetraalkylgermanium compounds. Specific examples of useful activators include n-butyllithium, diethylzinc, di-n-propylzinc, triethylboron, triethylaluminum, triisobutylaluminum, tri-n-hexylaluminum, ethylaluminum dichloride, dibromide and dihydride, isobutyl aluminum dichloride, dibromide and dihydride, di-n-propylaluminum chloride, bromide and hydride, diisobutyl-aluminum chloride, bromide and hydride, ethylaluminum sesquichloride, methyl aluminoxane ("MAO"), hexaisobutyl aluminoxane, tetraisobutyl aluminoxane, polymethyl aluminoxane, tri-n-octylaluminum, tetramethyl germanium, and the like. Other activators that are typically referred to as ionic cocatalysts may also be used; such compounds include, for example, $(C_6H_6)_3^+$, $C_6H_5$—$NH_2CH_3^+$, and fluorohydrocarbylboron compounds such as tetra(pentafluorophenyl)borate, sodium tetrakis[(bis-3,5-trifluoromethyl)phenyl]borate, $H^+(OCH_2CH_3)_2$ [(bis-3,5-trifluoromethyl)-phenyl]borate, trityltetra(pentafluorophenyl)borate, and trifluoromethanesulfonate, and salts or acids of $BF_4^-$, $Ph_4B^-$ (Ph=phenyl), p-toluenesulfonate, $SbF_6^-$, and $PF_6^-$. Mixtures of activators may, if desired, be used.

The catalysts are used to prepare polymeric compositions using conventional polymerization techniques known to those skilled in the art and/or described in the pertinent literature. The monomer(s), catalyst and catalyst activator are contacted at a suitable temperature at reduced, elevated or atmospheric pressure, under an inert atmosphere, for a time effective to produce the desired polymer composition. The catalyst may be used as is or supported on a suitable support. In one embodiment, the catalysts are used as homogeneous catalysts, i.e., as unsupported catalysts, in a gas phase or liquid phase polymerization process. A solvent may, if desired, be employed. The reaction may be conducted under solution or slurry conditions, in a suspension using a perfluorinated hydrocarbon or similar liquid, in the gas phase, or in a solid phase powder polymerization. Various additives may be incorporated into the mixture; particularly preferred additives are neutral Lewis bases such as amines, anilines and the like, which can accelerate the rate of polymerization.

Liquid phase polymerization generally involves contacting the monomer or monomers with the catalyst/activator mixture in a polymerization diluent, and allowing reaction to occur under polymerization conditions, i.e., for a time and at a temperature sufficient to produce the desired polymer product. The polymerization diluents are generally inert substances for example, aliphatic or aromatic hydrocarbons, e.g., liquified ethane, propane, butane, isobutane, n-butane, n-hexane, isooctane, cyclohexane, methylcyclohexane, cyclopentane, methylcyclopentane, cycloheptane, methylcycloheptane, benzene, ethylbenzene, toluene, xylene, kerosene, Isopar® M, Isopar® E, and mixtures thereof. Liquid olefins or the like which serve as the monomers or comonomers in the polymerization process may also serve as the diluent; such olefins include, for example, ethylene, propylene, butene, 1-hexene and the like.

The amount of catalyst in the diluent will generally be in the range of about 0.01 to 1.0 mmoles/liter, with activator added such that the ratio of catalyst to activator is in the range of from about 10:1 to 1:2000, preferably in the range of from about 1:1 to about 1:1200, on a molar basis.

Polymerization may be conducted under an inert atmosphere such as nitrogen, argon, or the like, or may be conducted under vacuum. Preferably, polymerization is conducted in an atmosphere wherein the partial pressure of reacting monomer is maximized. Liquid phase polymerization may be carried out at reduced, elevated or atmospheric pressures. In the absence of added solvent, i.e., when the olefinic monomer serves as the diluent, elevated pressures are preferred. Typically, high pressure polymerization in the absence of solvent is carried out at temperatures in the range of about 180 EC to about 300 EC, preferably in the range of about 250 EC to about 270 EC, and at pressures on the order of 200 to 20,000 atm, typically in the range of about 1000 to 3000 atm. When solvent is added, polymerization is generally conducted at temperatures in the range of about 150 EC to about 300 EC, preferably in the range of about 220 EC to about 250 EC, and at pressures on the order of 10 to 2000 atm.

Polymerization may also take place in the gas phase, e.g., in a fluidized or stirred bed reactor, using temperatures in the range of approximately 60 EC to 120 EC and pressures in the range of approximately 10 to 1000 atm.

In gas and slurry phase polymerizations, the catalyst is used in a heterogeneous process, i.e., supported on an inert inorganic substrate. Conventional materials can be used for the support, and are typically particulate, porous materials; examples include oxides of silicon and aluminum, or halides of magnesium and aluminum. Particularly preferred supports from a commercial standpoint are silicon dioxide and magnesium dichloride.

The polymeric product resulting from the aforementioned reaction may be recovered by filtration or other suitable techniques. If desired, additives and adjuvants may be incorporated into the polymer composition prior to, during, or following polymerization; such compounds include, for example, pigments, antioxidants, lubricants and plasticizers.

According to generally accepted mechanisms of addition polymerization using transition metal catalysts, incorporation of a monomer having a bulky substituent on the double bond, as in the hydrolyzable comonomers described herein, reduces the rate of further propagation. Thus, the reactive intermediate, having incorporated the hydrolyzable comonomer, is more likely to next undergo a chain transfer or terminating step than to continue propagation. For this reason, contiguous blocks of the hydrolyzable comonomer are not expected to be produced. In addition, it is expected that the hydrolyzable monomers are incorporated as chain extending components (that is, contained within the linear backbone of the polymer), rather than as crosslinking components. The latter structure would result from further propagation after addition of the diene monomer, which is not expected to be favorable. However, because this feature of metallocene catalysis varies among individual catalysts, some degree of crosslinking could be incorporated, if desired, by the use of a catalyst less sensitive to bulky substituents.

Various additives can optionally be used in preparing copolymer compositions according to the present invention, or added after polymerization has been completed. These additives may be included to modifying the stability, color, strength, or other properties of the resultant polymeric compositions. Suitable additives include such antioxidants as Hindered Amine Light Stabilizers (HALS) (e.g., bis-(1,2,2,5,5-pentamethylpiperidinyl)sebacate (Tinuvin 765)), phenolic antioxidants (e.g., t-butylcatechol), triethyl phosphite, t-butylhydroxyquinone and the like. In some cases, inclusion of such antioxidants can promote biodegradability of the polymers. Such additives may prevent premature autooxidation of the unsaturated polymer chains that are necessary for accelerated biodegradation.

Other optional additives may be included to enhance the degradability of the compositions upon exposure to light, particularly ultraviolet light in sunlight. Such additives, generally referred to as photosensitizers, are well known in the art, and include, by way of example, benzophenone, anthrone, anthraquinone, xanthone, 3-ketosteroids; and hydroxy-substituted 2,4-pentadienophenones. See, for example, U.S. Pat. No. 3,888,804 to Swanholm et al.

Other optional additives that may be included are compounds that can promote the oxidation of the copolymer, thus enhancing its degradability. Such prooxidants may be the transition metal salts of organic acids, e.g., stearates, naphthenates, oleates, and the like. See U.S. Pat. No. 4,983,651 to Griffin; U.S. Pat. No. 3,592,792 to Newland et al.; U.S. Pat. No. 3,454,510 to Greer et al.; U.S. Pat. No. 5,096,941 to Harnden; U.S. Pat. No. 3,951,884 to Miyoshi, et al.; and U.S. Pat. No. 3,956,424 to Jizuka et al.

Other additives that can be included in the degradable compositions are plasticizers, slip agents, antistatic agents, release agents, tackifiers, dyes, pigments, flame retardants, fillers such as carbon black, calcium carbonate, silicates, opacifiers such as titanium dioxide, and other additives well known to those skilled in the art. Examples of plasticizers are dioctyl azelate, dioctyl sebacate, or dioctyl adipate and other long chain length alkyl esters of di-, tri-, and tetra-carboxylic acids such as azelaic, sebacic, adipic, phthalic, terephthalic, isophthalic, and the like. Effective amounts of such plasticizers are typically in the range of from about 5 wt. % to 30 wt. % of the copolymer, more typically from about 7 wt. % to about 15 wt. % of the copolymer. Examples of slip agents are those commonly derived from amides of fatty acids having about 12 to 22 carbon atoms. Such agents can augment the anti-blocking properties of films and may be incorporated in amounts of from about 0.05% to about 3% based on the dry weight of the films when used. Examples of antistatic agents include ethoxylated amines and quaternary amine salts having organic constituents of about 12-18 carbon atoms in length. Agents of this type may slowly diffuse to the surface of the polymer and, because of their ionic character, form an electrically conductive layer on the surface. Antistatic agents may be incorporated in amounts of from about 1% to about 5% based on the dry weight of the films when used.

IV. Degradable Products

The hydrolyzable copolymers useful in the present invention can be combined with other degradable components by mixing, laminating, blending, coextrusion, etc., to provide degradable polymer-containing compositions that can be subsequently formed into degradable articles. These degradable polymer-containing compositions comprise from about 20 to about 99 wt. % copolymer as previously described and from about 1 wt. % to about 80 wt. % of another degradable component. Typically, these degradable copolymer-containing compositions comprise from about 30 wt. % to about 95 wt. % copolymer and from about 5 wt. % to about 70 wt. % the other degradable component, more typically from about 50 wt. % to about 90 wt. % copolymer and from about 10 wt. % to about 50 wt. % the other degradable component. The precise amounts of the copolymer and other degradable component(s) present in the degradable copolymer-containing composition will depend upon a number of factors, including the particular article to be made from the composition and its intended use. The other degradable component(s) may be hydrolyzable, cleavable with light, enzymatically degradable, or degradable via some other mechanism.

Other degradable components that may be suitable for use in the present invention include other degradable polymers such as lactic acid polymers and copolymers (e.g., poly(lactic acid) and poly(lactide-co-glycolide)), poly(hydroxy alkanoates) such as the homopolymers of 3-hydroxybutyrate and 4-hydroxybutyrate, and the copolymers of hydroxybutyrate with other hydroxy acids, for example, 3 hydroxypropionate, 3-hydroxyvalerate, 3-hydroxyhexanoate, 3-hydroxyoctanoate, or longer chain hydroxy acids (e.g., $C_9$-$C_{12}$ hydroxy acids), starch, natural rubber, gutta percha, balata, dextran, chitin, cellulose, wood flour, derivatives of biodegradable polymers including cellulose esters such as chitosan, cellulose nitrate, cellulose acetate, and block copolymers of polycaprolactone with polydienes; and the like. See U.S. Pat. No. 5,216,043 to Sipinen et al. and U.S. Pat. No. 3,921,333 to Clendinning et al. Particularly preferred additional degradable components include dextran, cis-polyisoprene and starch.

Suitable starches include any unmodified starch from cereal grains or root crops such as corn (e.g., zein), wheat, rice, potato, and tapioca. The amylose and amylopectin components of starch as well as modified starch products such as partially depolymerized starches and derivatized starches can also be used. The term "starch" encompasses all such starches, including starch components, modified starch products, and starch degradation products. The terms "modified starch" and "starch degradation products" include for example pregelatinized starches (cold swelling starch), acid modified starches, oxidized starches, slightly crosslinked starches, starch ethers, starch esters, dialdehyde starches, and degradation products of starch hydrolyzed products and dexatrenes. The particle size of the starch granules can, however, limit some of the attainable physical dimensions of certain articles, such as the gauge of thin films and coatings and the diameter of fibers. To facilitate the preparation of thinner films and fibers, the particle size of starches can be decreased by grinding with oversized particles being removed by procedures such as air classification. In addition, starch granules can be modified by treatments such as pregelatinization in which concentrated starch/water slurries are dried quickly by drum drying, spray drying, foam heat or puff extrusion. The pregelatinized starch can be dried and optionally ground and classified to yield fine starch particles. Other degradable derivatives of starch can be treated similarly. If desired, a mixture of two or more starches can be used.

In the preparation of degradable films, it is preferred that the starch be gelatinized. Gelatinization can be achieved by any known procedure such as heating in the presence of water or an aqueous solution at temperatures above about 60° C., until the starch granules are sufficiently swollen and disrupted that they form a smooth viscous dispersion in the water. The gelatinization can be carried out either before or after admixing the starch with the copolymer.

In preparing the copolymer-containing compositions, the starch (e.g., starch granules) is normally mixed or otherwise blended with the raw copolymer during processing to provide a composition suitable for casting, extruding, molding, or other fabrication procedure. If the copolymerization will efficiently take place under conditions such that the starch is not altered chemically or physically, starch granules can also be added to the copolymerization mixture prior to polymerization.

The hydrolyzable copolymers of the invention may, in addition, or in the alternatively, be blended with nondegradable polymers prior to fabrication of degradable articles. By "nondegradable" is meant that a polymer is not degradable hydrolytically, enzymatically, or under typical conditions of waste disposal involving exposure to the environment. The nondegradable polymers may be selected to provide the degradable with enhanced tensile strength, thermal stability, flexibility, or other properties that may be desirable for a particular type of degradable article. Such polymers include low density polyethylene (LDPE), high density polyethylene (HDPE), linear low density polyethylene (LLDPE), ethylene-propylene rubber, polystyrene, polyvinylchloride (PVC), polyhalocarbons, and copolymers of ethylene with propylene, isobutene, butene, hexene, octene, vinyl chloride, vinyl alcohol, and the like. The polymer blends can also include rubber materials such as polychloroprene, polybutadiene, polyisoprene, polyisobutylene, nitrile-butadiene rubber, styrene-butadiene rubber, chlorinated polyethylene, chlorosulfonated polyethylene, epichlorohydrin rubber, butyl rubber, or halobutyl rubber.

Typically, if a nondegradable polymer is blended with one or more degradable copolymers of the invention and optionally other degradable polymers, the degradable portion of the composition will generally represent 5 wt. % to about 99 wt. % of the composition, preferably about 10 wt. % to 95 wt. % of the composition, most typically about 15 wt. % to about 90 wt. % of the composition.

The invention enables the preparation of a wide variety of products, e.g., films, fibers, foams, woven fabrics, nonwoven fabrics, and molded articles, for which degradability is desired. For example, the present copolymers can be used to make shaped articles by injection molding, blow molding, thermal forming of sheets, rotational molding of powder, extrusion, and other molding or shaping processes. The following is a nonexclusive list of such end uses and articles: agricultural film products, including agricultural mulch and film products containing seeds, fertilizers, pesticides, herbicides, and the like; adhesive tape substrates; bed linens, including sheets and pillowcases; containers, including bottles and cartons; disposable absorbent articles, such as diapers, sanitary napkins, incontinence pads, pantyliners, and tampons; packaging materials; bags, e.g., shopping bags, dust bags, garment bags, garbage bags, lawn waste bags, and industrial bags; labels; tags; protective clothing; surgical drapes; sponges; tampon applicators; disposable syringes; temporary enclosures and temporary siding; toys; wipes; foamed plastic products such as food packaging, foamed packing components, bottles or containers prepared by injection molding or vacuum forming; and controlled release pellets, strips, and tabs containing an active ingredient intended for slow release, including controlled release pharmaceutical products, products containing pesticides, and products containing pest-repellents such as flea collars or cattle ear tags.

Films, fibers, foams, woven fabrics, and nonwoven fabrics prepared from the copolymers of the invention have particular utility in disposable absorbent articles. By "absorbent article" herein is meant a consumer product that is capable of absorbing significant quantities of blood, urine or other fluids, like aqueous fecal matter (runny bowel movements), discharged by an incontinent wearer. Examples of such absorbent articles include disposable diapers, incontinence garments and pads, personal hygiene materials such as diapers, sanitary napkins, incontinence pads, pantyliners, disposable training pants, bed pads, clothing shields, and the like.

Absorbent articles such as diapers, sanitary napkins, incontinence pads, pantyliners, and training pants typically contain an absorbent core between a fluid-impermeable backsheet and a fluid-permeable topsheet, wherein when the article is in use, it is positioned so that fluid comes into contact with the topsheet and flows therethrough to the absorbent core, which serves to absorb the fluid and contain it by virtue of the backsheet. At least one of the topsheet and backsheet and preferably both are made from the copolymers of the present invention, or blends of these copolymers with other degradable or nondegradable components as explained above. The topsheet is usually positioned adjacent to the body surface of the absorbent core. The topsheet is preferably joined to the backsheet by attachment means such as those well known in the art. In preferred absorbent articles, the topsheet and the backsheet are joined directly to each other at the periphery thereof. See U.S. Pat. No. 3,860,003 to Buell; U.S. Pat. No. 4,808,178 to Aziz et al.; U.S. Pat. No. 4,695,278 to Lawson; and U.S. Pat. No. 4,816,025 to Foreman, for representative diaper configurations.

The backsheet prevents body fluids that are absorbed and contained in the absorbent core from wetting articles that are in contact with the absorbent article such as pants, pajamas, undergarments, and the like. The backsheet can be in the form of a woven or nonwoven material, a film, or a composite material such as a film-coated nonwoven material. Preferably, the backsheet is a nonwoven material having a thickness of from about 0.012 mm (0.5 mil) to about 0.051 mm (2.0 mils). The backsheet is preferably embossed and/or matte finished to provide a more clothlike appearance. Further, the backsheet can be modified to permit vapors to escape from the absorbent core (i.e., be breathable) while still preventing body fluids from passing through the backsheet. In a preferred embodiment, the present copolymers are simply cast into nonperforated, flexible sheets of a woven or nonwoven material.

The topsheet is preferably compliant, soft feeling, and non-irritating to the wearer's skin. Further, the topsheet is fluid permeable and preferably non-absorbent, thereby allowing body fluids to penetrate through the entirety of the topsheet to the absorbent core. Thus, the surface of the formed film that is in contact with the body remains dry, thereby reducing body soiling and creating a more comfortable feel for the wearer. A suitable topsheet can be manufactured in a wide variety of forms such as nonwoven fabrics; apertured formed films, hydroformed films; porous foams; reticulated films; and scrims. Preferred topsheets for use in absorbent articles of the present invention are selected from nonwoven topsheets and apertured formed film topsheets. In the fabrication of nonwoven (and woven) topsheet materials, the present copolymers can be provided in the form of filaments from which a nonwoven (or woven) web is made. With apertured formed film topsheets, the copolymers can be cast as sheets having a multiplicity of perforations therethrough. The formation of perforated sheets and webs for use as topsheets is well known in the art. Suitable methods for making formed films are described in U.S. Pat. No. 3,929,135 to Thompson; U.S. Pat. No. 4,324,246 to Mullane, et al.; U.S. Pat. No. 4,342,314 to Radel et al.; U.S. Pat. No. 4,463,045 to Ahr et al.; and U.S. Pat. No. 5,006,394 to Baird. Each of these patents are incorporated herein by reference. Microapertured formed film topsheets and especially methods for making such topsheets are disclosed in U.S. Pat. No. 4,609,518 to Curro et al., and U.S. Pat. No. 4,629,643 to Curro et al., which are incorporated by reference.

The body surface of the formed film topsheet can be hydrophilic so as to help body fluids to transfer through the topsheet faster than if the body surface was not hydrophilic so as to diminish the likelihood that fluid will flow off the topsheet rather than flowing into and being absorbed by the absorbent structure. In one embodiment, surfactant is incorporated into the polymer of the formed film topsheet. In another embodiment, the body surface of the topsheet can be made hydrophilic by treating it with a surfactant such as is described in U.S. Pat. No. 4,950,264 to Osborn, which is incorporated herein by reference.

The absorbent core can be composed of any number of typical absorbent materials used in diapers, sanitary napkins, incontinence pads, and the like. The absorbent material is generally cellulosic, e.g., composed of oxidized cellulose or ordinary cellulose fibers, optionally containing additional absorbent materials such as acrylates, starch-grafted acrylates, and various gums and/or saccharidic gelling materials that absorb and hold on the order of ten to fifty times their weight of water. Such materials are thoroughly described in the patent literature relating to disposable sanitary products, and are available from various commercial sources. For disposable diapers, the entire article may be fabricated from the aforementioned materials, i.e., having an outer backsheet, an inner topsheet, and an absorbent core therebetween. The diaper may be a single integral structure that, once fitted onto an infant, is secured by a fastener on either side of the waist, e.g., tape or other adhesive means. The diaper may also be in the form of an undergarment with two leg holes, in which case it is preferred that an elastic material be incorporated as a leg band to ensure a snug fit of the diaper around the legs. Incontinence pads are also structured in this manner.

The degradable copolymers of the invention are also useful for beverage carriers comprising a plurality of connected annular sections where each annular section is capable of releasably securing a container such as a bottle or can. Such carriers may be referred to as "six-pack rings," although the carrier can typically comprise from two to twelve such annular rings, more typically from four to six rings. See, for example, U.S. Pat. No. RE 29,873 to Cunningham, and U.S. Pat. No. 3,938,656 to Owen, which disclose "six-pack rings" of various types.

Another use of the degradable copolymers is in the fabrication of temporary coverings for the ground and are especially useful as agricultural mulch. Ground coverings may be provided in the form of films or sheets that can be spread out or otherwise applied to the ground to be covered. Ground coverings that are made from blends of the present copolymers with starch can be particularly desirable since the starch portion of the covering may be able to disintegrate relatively quickly with the residual copolymer ultimately degrading completely.

The degradable copolymers can also be used in degradable packaging materials for wrapping various products. Edible products such as foods and beverages may be packaged with such materials. Packaging materials made from blends of the copolymers with starch can be particularly desirable since such materials can disintegrate fairly rapidly if improperly discarded as litter and are expected to ultimately degrade completely.

The copolymers can also be used to deliver pesticides, insect repellents, herbicides, and the like. For example, when blended with suitable pesticides and shaped into a strip, the copolymers can form degradable flea or tick collars. Similar blends formed into tags with a suitable attachment device can form degradable ear tags used for livestock to ward off flies and other insects. Suitable pesticides may include various chlorinated types such as Chlordane, pyrethroid/pyrethrin types such as Permethrin, organophosphates and carbamates such as Malathion, carbaryl and diazinon, repellents such as m-diethyl toluamide, diethylphenyl acetamide, and limonene, insect growth regulants such as methoprene, hydroprene, and fenvalerate, synergists such as piperonyl butoxide, and the like.

The copolymers are also suitable for use as fibers or filaments in nonwoven materials. Fibers and filaments are interchangeable terms in the general sense, but where a more specific acknowledgment of length is appropriate, the term "fibers" is intended to refer to short filaments as in "staple fibers." The degradable copolymers can be converted to fibers or filaments by meltspinning techniques or the like. Deniers of from about 2 to about 15 dpf are most common. The filaments can be used as they are spun (undrawn) or they may be used in a stretched (drawn or oriented) condition. Drawing to reduce denier or for increasing orientation can be accomplished by the usual procedures known in the art.

Suitable thermoplastic fibers according to the present invention can be in the form of thermally bondable bicomponent fibers. As used herein, "biocomponent fibers" refers to thermoplastic fibers that comprise a core fiber made from one polymer (or copolymer) that is encased within a thermoplastic sheath made from a different polymer (or copolymer). The polymer comprising the sheath often melts at a different, typically lower, temperature than the polymer comprising the core. As a result, these bicomponent fibers can provide thermal bonding by controlled melting of the sheath polymer, while retaining the desirable strength characteristics of the core polymer. An example of a degradable bicomponent fiber according to the present invention is a sheath made of the copolymer surrounding a core made from a higher melting degradable polymer such as a polyvinyl alcohol or rayon or a copolymer with similar properties.

Bicomponent fibers according to the invention can be concentric or eccentric. As used herein, the terms "concentric" and "eccentric" refer to whether the sheath has a thickness that is even, or uneven, through the cross-sectional area of the bicomponent fiber. Eccentric bicomponent fibers can be desirable in providing more compressive strength at lower fiber thicknesses. Suitable bicomponent fibers for use herein can be either uncrimped (i.e., unbent) or crimped (i.e., bent). Bicomponent fibers can be crimped by typical textile means such as, for example, a stuffer box method or the gear crimp method to achieve a predominantly two-dimensional or "flat" crimp.

Fibers made from the degradable copolymers of the present invention can be formed into nonwoven fabrics by a number of processes to provide spunbonded fabrics and fabrics made using staple fibers. Spunbonded nonwovens can be prepared by spinning and laying down simultaneously into webs of continuous filaments using known methods of distributing the threadline in the desired orientation in the web plane. Such webs can be thermally bonded under suitable conditions of time, temperature and pressure to yield strong fabrics with tensile properties that are usually superior to those obtained with staple webs. Bonding can also be carried out by using suitable adhesives and both these methods can be used to make point bonded or area bonded fabrics. Needle punching can also be used to give the webs stability and strength. Spunbonded fabrics can also be made by melt blowing these polymers. In this process, a stream of the molten polymer or blend is extruded into a high velocity stream of heated dry air and a bonded web formed directly on a screen conveyor from the resultant fibers. Nonwoven fabrics can also be made by direct extrusion through a rotating die into a netlike product. See U.S. Pat. No. 5,219,646 to Gallagher et al., which is incorporated herein by reference.

The degradable copolymers can also be used to make degradable foamed plastics. These include foamed containers, foamed packing components (e.g., "peanuts"), and the like. The foamed plastic can be made by compounding the copolymer or blend with a suitable blowing agent such as pentane and then heating to volatilize the blowing agent. Typically, a surfactant suitable for stabilizing the air-liquid interface is employed as well. The foam can be used as is or can be cut into smaller pieces (commonly referred to as "peanuts") suitable as loose packaging filler.

Films of the degradable copolymers or blends can be laminated to various sheets and films using procedures well known in the art to provide sheets and films having desired properties. The choice of laminate and film may be varied for a particular purpose.

Any of the aforementioned products may be prepared from the degradable copolymers per se, with a polymer blend composed of at least one degradable copolymer of the invention and at least one other degradable component and/or nondegradable copolymer, or from a degradable composition containing a degradable copolymer of the invention per se, a polymer blend composed of at least one degradable copolymer of the invention and at least one other degradable component and/or nondegradable copolymer, and one or more additives as described earlier herein, e.g., prooxidants, stability enhancers, tensile strength enhancers, photosensitizers, colorants, plasticizers, tackifiers, and fillers.

The invention additionally pertains to degradable articles, including films, fibers, foams, woven fabrics, nonwoven fabrics, and molded articles fabricated from olefin polymers containing substantially inert monomer units (e.g., monomer units resulting from polymerization of olefins not containing any heteroatoms or non-hydrocarbyl substituents) and cleavable monomer units, i.e., monomer units containing a site that is chemically, enzymatically, or photolytically cleavable, preferably hydrolytically cleavable, wherein the cleavable monomer units represent at least 10 mole %, or at least 15 mole %, or at least 20 mole % of the copolymer, and up to 50 mole % or more. For most applications, as with the degradable copolymers of the invention, the copolymer will contain about 0.1 mole % to about 50 mole % of the cleavable monomer units.

It is to be understood that while the invention has been described in conjunction with the preferred specific embodiments thereof, that the description above as well as the examples which follow are intended to illustrate and not limit the scope of the invention. Other aspects, advantages and modifications within the scope of the invention will be apparent to those skilled in the art to which the invention pertains.

All patents, patent applications, journal articles and other reference cited herein are incorporated by reference in their entireties.

Experimental

The following examples are put forth so as to provide those of ordinary skill in the art with a complete disclosure and description of how to prepare and use the catalysts of the invention. Efforts have been made to ensure accuracy with respect to numbers (e.g., amounts, temperature, etc.) but some errors and deviations should be accounted for. Unless indicated otherwise, parts are parts by weight, temperature is in EC and pressure is at or near atmospheric.

Examples 1 and 2 describe the copolymerization of a diolefin containing a bicyclic acetal linkage with ethylene, and Examples 3 and 4 describe copolymerization of ethylene with olefins containing a siloxane linkage. The amount of comonomer used in each example, based on the estimated initial amount of ethylene in the pressurized reactor, was as follows: Examples 1 and 2, 5.38 mmol, approximately 20-25 mole % of the total monomer composition; Example 3, 8.44 mmol, approximately 31-39 mole % of the total monomer composition; and Example 4, 12.31 mmol, approximately 46-57 mole % of the total monomer composition. The reactions were carried out at low to moderate temperature and pressure, i.e., 0 to 50 EC and less than 100 psi. Examples 5 and 6 describe copolymerization of ethylene with a diolefin containing an enol ether linkage and an anhydride linkage, respectively, with the hydrolyzable comonomer in Example 5 representing approximately 27-34 mole % of the total monomer composition (7.5 mmol) and the hydrolyzable comonomer in Example 6 representing approximately 20-24 mole % of the total monomer composition (5.25 mmol).

EXAMPLE 1

Preparation of Ethylene/3,9-Divinyl-2,4,8,10-Tetraoxaspiro[5.5]Undecane Copolymer Using a Zirconium Metallocene Complex as Catalyst This example describes copolymerization of ethylene with 3,9-divinyl-2,4,8,10-tetraoxaspiro[5.5]undecane, i.e., a hydrolyzable comonomer containing a hydrolytically cleavable bicyclic acetal linkage, the comonomer having the structure

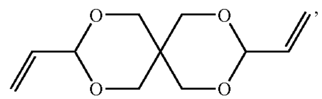

using a metallocene catalyst. The catalyst used was $(CH_3)_2Si(C_{16}H_{12})_2ZrCl_2$ (molecular weight 628.83, available from Hoechst; $C_{16}H_{12}$/2-methyl-4-phenylindenyl), the molecular structure of which is as follows:

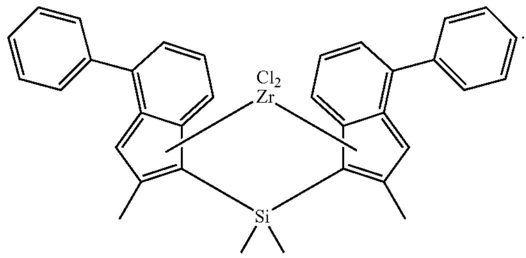

A glass reactor was flushed with argon and charged with 100 mL of toluene and 1.0 g (5.38 mmol) of 3,9-divinyl-2,4,8,10-tetraoxaspiro[5.5]undecane. The reactor was then flushed with ethylene, and the solution was stirred with an overhead mechanical stirrer. A solution of 0.5 g TMA (trimethylaluminum)-free MAO (methyl aluminoxane) in 2 mL toluene was added, the reactor was pressurized with ethylene to 25 psi for 1 minute. The pressure was released, and a catalyst/MAO mixture, prepared from 0.5 g TMA-free MAO in 2 mL of toluene and 0.013 mmoles of $(CH_3)_2Si(C_{16}H_{12})_2ZrCl_2$ was added. The reactor was then pressurized to 45 psi ethylene and isolated from the ethylene supply. The pressure drop was monitored over the next two hours (reaction carried out at about 20 EC) and observed to drop by 16 psi. When little further pressure drop was detected, at about 100 min, the reaction was quenched with 2×10 mL methanol. The copolymer was isolated by filtration, washed with methanol, and dried under vacuum for 16 hours to give 1.27 g of a powdery solid.

Figure 2:
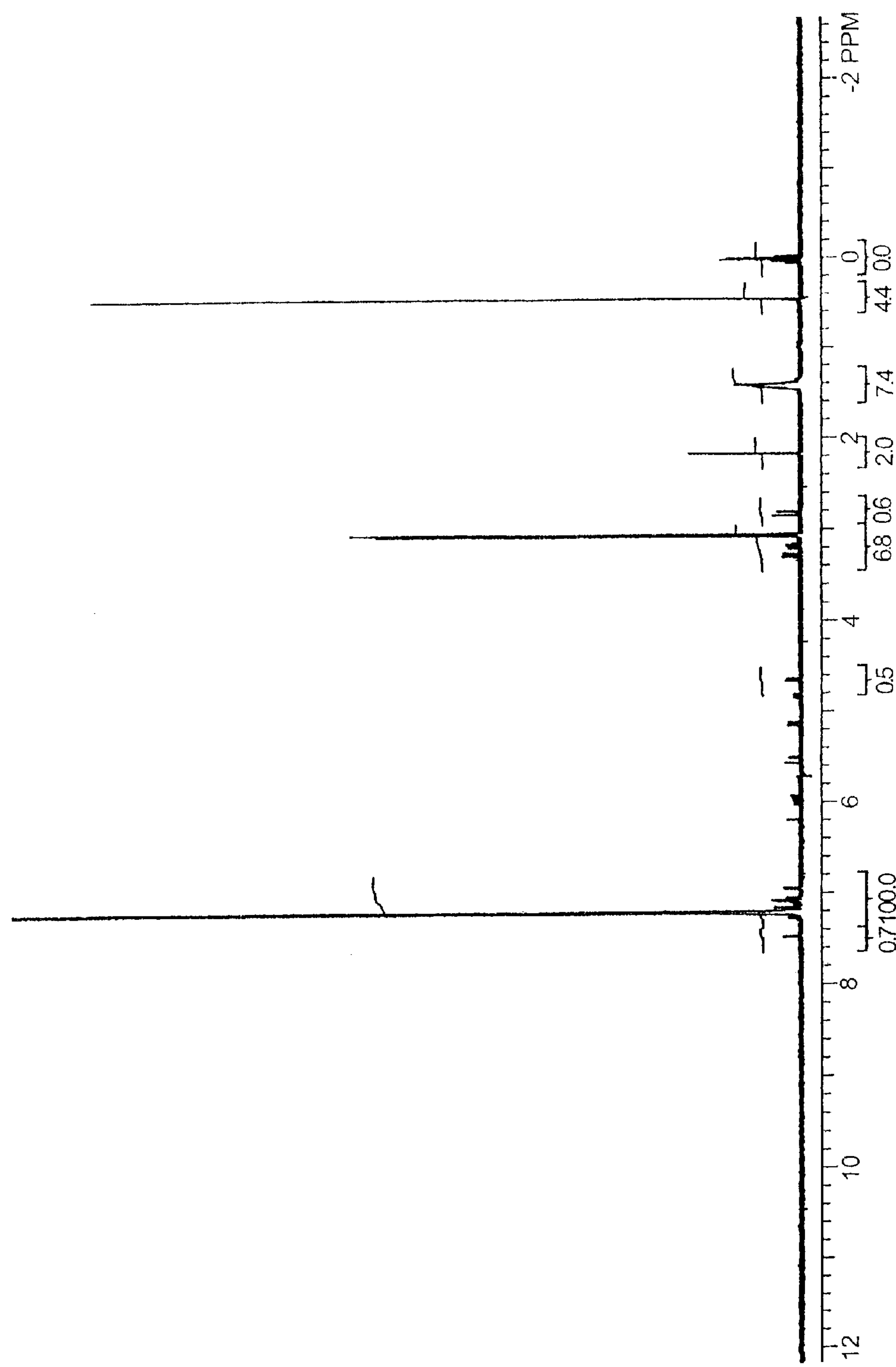

$^1H$ NMR of the copolymer and the hydrolyzable divinyltetraoxaspiro undecane monomer established the incorporation of the hydrolyzable monomer in the copolymer (FIGS. 1-2). Based on the NMR data, the structure of the copolymer appeared to be that of a single stranded polyethylene chain with incorporation of the comonomer primarily as a chain extender (i.e., contained within the backbone of the copolymer) with some degree of monofunctional incorporation (i.e., as a short side chain).

The NMR analysis clearly showed incorporation of the monomer, estimated, from integration of the peaks, to be about 20 mole %. Although some degree of crosslinking could not be ruled out, gel permeation chromatography (GPC) did not give any evidence of significant crosslinking in these samples.

Molecular weight determination: The copolymerization procedure was repeated, and the molecular weights of the products obtained from the initial copolymerization reaction and the repeated copolymerization reaction were then estimated via gel permeation chromatography (GPC), using as standards a 106,096 $M_w$ polyethylene and a 52,497 $M_w$ polyethylene. Each analysis gave a single peak. The first sample gave an $M_n$ of 53,787 and an $M_w$ of 172,503; the second sample gave a an $M_n$ of 64,260 and an $M_w$ of 139,782.

EXAMPLE 2

Preparation of Ethylene/3,9-Divinyl-2,4,8,10-Tetraoxaspiro[5.5]Undecane Copolymer Using a Titanium Metallocene Complex as Catalyst The reaction of Example 1 was repeated using 0.0123 mmol of a titanium metallocene complex as the reaction catalyst. The catalyst was $(CH_3)_2Si$(1,2,3,4-tetramethyl cyclopentadiene)(t-Bu)$TiCl_2$ (Dow), the molecular structure of which is as follows:

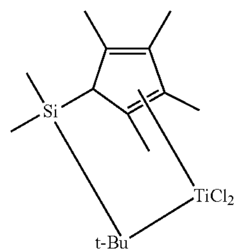

The copolymer was isolated by filtration, washed with methanol, and dried under vacuum for 16 hours to give 1.3 g of a powdery solid.

EXAMPLE 3

Preparation of Ethylene/Diallyltetramethyldisiloxane Copolymer

This example describes copolymerization of ethylene with diallyldimethylsiloxane, a hydrolyzable comonomer containing a hydrolytically cleavable siloxane linkage, the comonomer having the structure

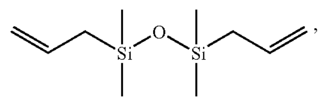

using the metallocene catalyst of Example 1.

A glass reactor fitted with an overhead stirrer was charged with 100 mL of toluene and 1.52 g (8.44 mmol) of diallyldimethylsiloxane. The reactor was then purged and degassed by repeated cycles of pressurizing with argon to 25 psig and evacuation under vacuum. A solution of 0.5 g of TMA-free MAO in 2 mL of toluene was added under argon and the reactor pressurized with ethylene to 25 psig for 1 minute. The pressure was released and a catalyst/MAO mixture, prepared from a freshly prepared mixture of 0.5 g of TMA-free MAO in 2 mL of toluene and 0.0175 mmoles of catalyst in 3 mL of toluene was added.

The reactor was then pressurized to 45 psi ethylene and isolated from the ethylene supply. The pressure drop was monitored over the next two hours (reaction carried out at room temperature) and ethylene pressure was observed to rapidly drop. The reaction was allowed to continue for 1.5 hours at which time the pressure had dropped to approximately 5 psi. The reaction was quenched with 2×10 mL methanol. The polymer was isolated by filtration, washed with methanol, and dried until constant weight to give 2.69 g of a white solid.

EXAMPLE 4

Preparation of Ethylene/Tetraallyloxysilane Copolymer

This example describes copolymerization of ethylene with tetraallyloxysilane, a hydrolyzable comonomer containing hydrolytically cleavable siloxane linkages, the comonomer having the structure

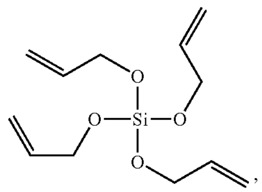

using the metallocene catalyst of Example 1.

A glass reactor fitted with an overhead stirrer was charged with 100 mL of toluene and 2.98 g (11.64 mmol) of tetraallyloxysilane. The reactor was then purged and degassed by repeated cycles of pressurizing with argon to 25 psig and evacuation under vacuum. A solution of 0.5 g of TMA-free MAO (methyl aluminoxane) in 2 mL of toluene was added under argon and the reactor pressurized with ethylene to 25 psig for 1 minute. The pressure was released and a catalyst/MAO mixture, prepared from a freshly prepared mixture of 0.5 g of TMA-free MAO in 2 mL of toluene and 0.0159 mmoles of catalyst in 3 mL of toluene was added.

The reactor was then pressurized to 45 psig of ethylene and isolated from the ethylene supply. The pressure drop was monitored over the next two hours (reaction carried out at room temperature). The reaction was allowed to continue for 1.5 hours at which time the pressure had dropped to approximately 5 psi. The reaction was quenched with 2×10 mL methanol. The polymer was isolated by filtration, washed with methanol, and dried until constant weight to give 1.07 g of a white solid.

EXAMPLE 5

Preparation of Ethylene/1-Allyloxy-Penta-1,4-Diene Copolymer

This example describes copolymerization of ethylene with 1-allyloxy-penta-1,4-diene, a hydrolyzable comonomer containing a hydrolytically cleavable enol ether linkage, the comonomer having the structure

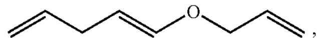

using the metallocene catalyst of Example 2.

A glass reactor fitted with an overhead stirrer is charged with 100 mL of toluene and 0.915 g (7.5 mmol) of 1-allyloxy-penta-1,4-diene. The reactor is then purged and degassed by repeated cycles of pressurizing with argon to 25 psig and evacuation under vacuum. A solution of 0.5 g of TMA-free MAO in 2 mL of toluene is added under argon and the reactor pressurized with ethylene to 25 psig for 1 minute. The pressure is released and a catalyst/MAO mixture, prepared from a freshly prepared mixture of 0.5 g of TMA-free MAO in 2 mL of toluene and 0.010 mmoles of catalyst in 3 mL of toluene is added.

The reactor is then pressurized to 45 psi ethylene and isolated from the ethylene supply. The pressure drop is monitored over the next two hours (reaction carried out at room temperature) and ethylene pressure is observed to rapidly drop. The reaction is allowed to continue for 1.5 hours at which time the pressure drops to approximately 5 psi. The reaction is quenched with 2×10 mL methanol. The polymer may be isolated by filtration, washed with methanol, and dried until constant weight to give the desired copolymer.

EXAMPLE 6

Preparation of Ethylene/Anhydride Copolymer

This example describes copolymerization of ethylene with a hydrolyzable comonomer containing a hydrolytically cleavable anhydride linkage, the comonomer having the structure

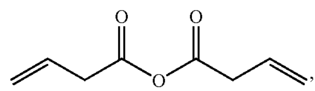

using the diimine catalyst [Ar—N=C($CH_3$)—C($CH_3$)=N—Ar]Pd$Cl_2$, wherein Ar is 2,4,6-triisopropyl-phenyl, having the molecular structure

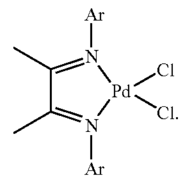

Methylene chloride (150 mL) is placed in a 300-mL glass reactor, which is then flushed and charged with ethylene to a pressure of 15 psig. The solution is allowed to equilibrate at room temperature for 15 min, and then a solution of catalyst (approximately 0.01 mmol) and 0.81 g (5.25 mmol) anhydride in methylene chloride is added. A solution of sodium tetrakis[3,5-bis(trifluoromethyl)phenyl]borate (NaBAF; 1 eq) in methylene chloride (10 mL) is injected into the reactor with argon overpressure to form the active catalyst in situ and initiate polymerization. After the desired time period, an aliquot is removed and evaporated to dryness. The sample is analyzed by $^{1}H$ NMR, and the NMR spectrum confirms the incorporation of both monomers in the copolymer product.

EXAMPLE 7

Hydrolysis of Copolymers

Three 0.2 g samples of each of the copolymers prepared in Examples 1 and 2 were placed in 10 ml of pH 4, pH 7 and pH 10 buffer solutions. The six solutions were stirred for 18 hours at ambient temperature. After stirring the samples were centrifuged for 5 minutes and the liquid decanted off. The samples were transferred into vials and dried overnight in a vacuum oven. The samples were then weighed. The results are presented in Table 1 and in FIG. 3.

TABLE 1

| | Copolymer wt. (g) | Copolymer wt. (g) | Percent Dissolution | |
|---|---|---|---|---|
| pH | Example 1 | Example 2 | Example 1 | Example 2 |
| 4 | 0.134 | 0.131 | 33.0% | 34.5% |
| 7 | 0.125 | 0.132 | 37.5% | 34.0% |
| 10 | 0.125 | 0.110 | 37.5% | 45.0% |

Figure 3:
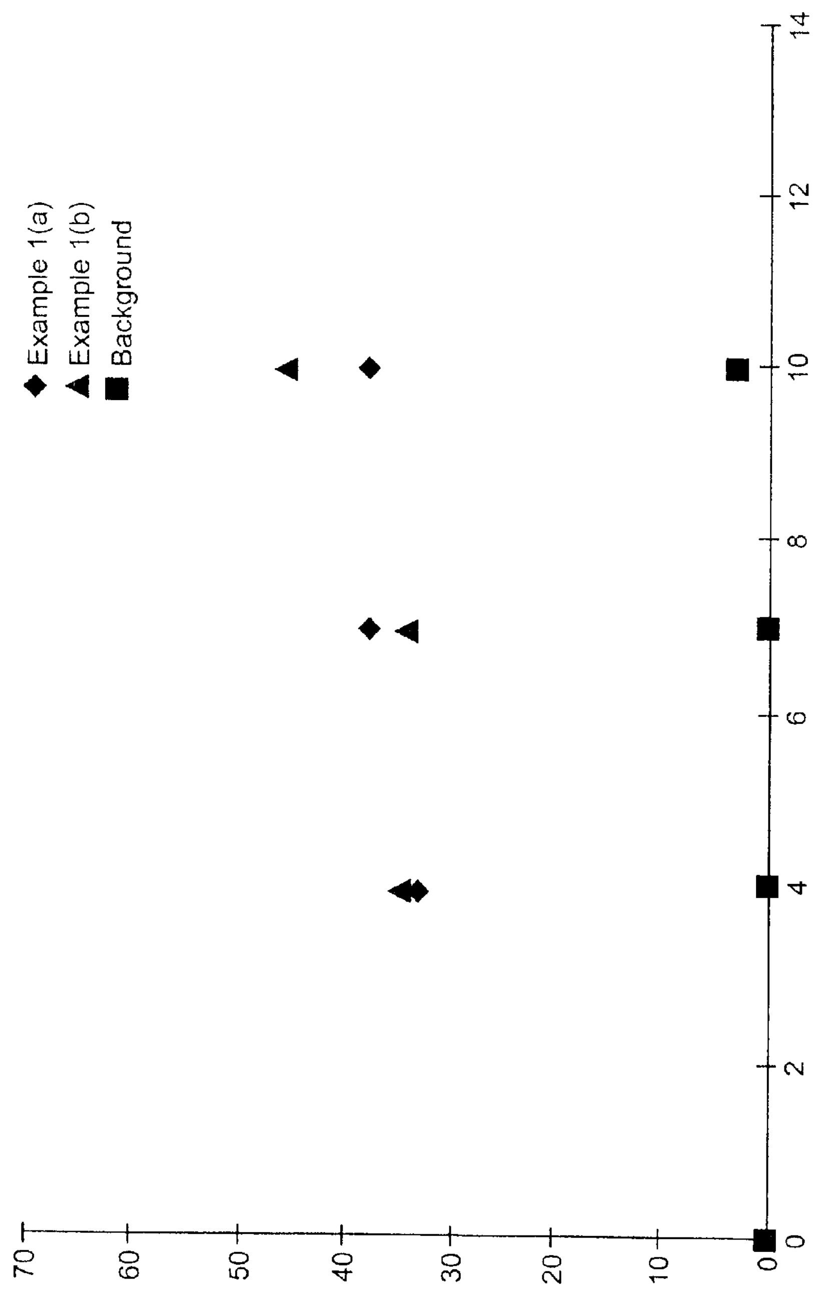
FIG. 3 is a graph of hydrolysis data showing the percentage of dissolved polymer relative to pH as described in Example 7 for the copolymer of Example 1.

The hydrolysis data in Table 1 and FIG. 3 and the NMR spectra of FIGS. 1 and 2 indicate that the invention provides olefin copolymers in which the amount of a polar, hydrolyzable monomer that can be incorporated is substantially increased relative to copolymers synthesized using prior art methods. For example, the process described by Austin et al., in International Patent Publication No. WO 92/12185, using a radical-initiated ring-opening copolymerization reaction between ethylene and a cyclic ketene acetal, 2-methylene-1,3-dioxepane (MDOP), results in a polyester containing only 3.20 mole % of the "hydrolyzable" monomer, even when the level of MDOP in the feed was 25 wt. %. By contrast, 20 mole % incorporation was achieved in the copolymer of Example 1.

Samples (0.2 g aliquots) of the copolymers prepared in Examples 3 and 4 were evaluated as above, at various pH levels. After treatment the mixtures were filtered and washed with water and oven dried until constant weight. The results are presented in Table 2.

TABLE 2

| pH | Example | Weight Recovered (g) | Percent Dissolution |
|---|---|---|---|
| 4 | 3 | 0.200 | 0 |
| 7 | 3 | 0.200 | 0 |
| 10 | 3 | 0.200 | 0 |
| 13 | 3 | 0.183 | 8.5 |
| 14 | 3 | 0.153 | 23.5 |
| 4 | 4 | 0.130 | 35.0 |
| 7 | 4 | 0.162 | 19.0 |
| 10 | 4 | 0.157 | 21.5 |

The data in Table 2 indicate that a higher pH may be required to effect hydrolysis of certain copolymers, and that variations in copolymer structure can provide a higher or lower degree of hydrolysis. The siloxane copolymer prepared from the tetraolefin of Example 4 resulted in greater dissolution upon hydrolysis at pH 4, 7, and 10, while the siloxane copolymer of Example 3, prepared from the corresponding diolefin, required a higher pH to effect significant hydrolysis.

We claim:

1. A degradable article at least partially comprising a degradable copolymer composed of at most 80 mole % of nonhydrolyzable monomer units resulting from polymerization of nonhydrolyzable olefin monomers, and at least 20 mole % of hydrolyzable monomer units resulting from polymerization of hydrolyzable olefin monomers containing at least one linkage that is hydrolytically cleavable under acidic or basic conditions, wherein the at least one hydrolytically cleavable linkage is contained within the backbone of the copolymer.

2. The article of claim 1, selected from films, fibers, foams, woven fabrics, nonwoven fabrics, and molded articles.

3. The article of claim 1, further comprising at least one additional degradable component.

4. The article of claim 1, further comprising a nondegradable polymer.

5. The article of claim 3, further comprising a nondegradable polymer.

6. The article of claim 1, selected from: agricultural film products; adhesive tape substrates; bed linens; containers; disposable absorbent articles; packaging materials; bags; labels; pillow cases; protective clothing; surgical drapes; sponges; tampon applicators; disposable syringes; temporary enclosures and temporary siding; toys; wipes; foamed plastic products; and controlled release pellets, strips and tabs.

7. The article of claim 1, in the form of a disposable absorbent article.

8. The article of claim 7, comprising a water-permeable topsheet, a water-impermeable backsheet, and an absorbent core therebetween, wherein at least one of the topsheet and the backsheet is comprised of the degradable copolymer.

9. The article of claim 8, in the form of a diaper, sanitary napkin, incontinence pad, or pantyliner.

10. The article of claim 1, wherein:

the nonhydrolyzable olefin monomers are addition polymerizable monomers of the form $R^1CH{=}CHR^2$, wherein $R^1$ is hydrido, $C_1$-$C_{24}$ alkyl, substituted $C_1$-$C_{24}$ alkyl, $C_1$-$C_{24}$ heteroalkyl, or substituted $C_1$-$C_{24}$ heteroalkyl, and $R^2$ is hydrido, $C_1$-$C_{24}$ alkyl, substituted $C_1$-$C_{24}$ alkyl, $C_1$-$C_{24}$ heteroalkyl, substituted $C_1$-$C_{24}$ heteroalkyl, $C_2$-$C_{24}$ alkenyl, substituted $C_2$-$C_{24}$ alkenyl, $C_2$-$C_{24}$ heteroalkenyl, substituted $C_2$-$C_{24}$ heteroalkenyl, $C_5$-$C_{24}$ aryl, substituted $C_5$-$C_{24}$ aryl, $C_5$-$C_{24}$ heteroaryl, substituted $C_5$-$C_{24}$ heteroaryl, $C_6$-$C_{24}$ alkaryl, substituted and/or heteroatom-containing $C_6$-$C_{24}$ alkaryl, or halo, or wherein $R^1$ and $R^2$ are linked to form a cyclic group; and the hydrolyzable olefin monomers are addition polymerizable monomers of the form $R^3CH{=}CH\text{-}(L^1)_m\text{-}X\text{-}(L^2)_n\text{-}CH{=}CHR^4$ wherein $R^3$ and $R^4$ are independently hydrido, $C_1$-$C_{24}$ alkyl, substituted $C_1$-$C_{24}$ alkyl, $C_1$-$C_{24}$ heteroalkyl, substituted $C_1$-$C_{24}$ heteroalkyl, $C_5$-$C_{24}$ aryl, substituted $C_5$-$C_{24}$ aryl, $C_5$-$C_{24}$ heteroaryl, or substituted $C_5$-$C_{24}$ heteroaryl, m and n are independently zero or 1, $L^1$ and $L^2$ are optionally substituted and/or heteroatom-containing hydrocarbylene, and X is a hydrolytically cleavable linkage.

11. The article of claim 10, wherein:

$R^1$ is hydrido or $C_1$-$C_{12}$ alkyl; and $R^2$ is hydrido, $C_1$-$C_{12}$ alkyl, substituted $C_1$-$C_{12}$ alkyl, $C_1$-$C_{12}$ heteroalkyl, substituted $C_1$-$C_{12}$ heteroalkenyl, $C_2$-$C_{12}$ alkenyl, substituted $C_2$-$C_{12}$ alkenyl, $C_2$-$C_{12}$ heteroalkenyl, substituted $C_2$-$C_{12}$ heteroalkenyl, $C_5$-$C_{14}$ aryl, substituted $C_5$-$C_{14}$ aryl, $C_5$-$C_{14}$ heteroaryl, substituted $C_5$-$C_{14}$ heteroaryl, $C_6$-$C_{16}$ alkaryl, substituted and/or heteroatom-containing $C_6$-$C_{16}$ alkaryl, or halo, or wherein $R^1$ and $R^2$ are linked to form a bridge -Q- wherein Q is a three-atom to seven-atom hydrocarbylene spacer; $R^3$ and $R^4$ are independently hydrido, $C_1$-$C_{12}$ alkyl, substituted $C_1$-$C_{12}$ alkyl, $C_1$-$C_{12}$ heteroalkyl, substituted $C_1$-$C_{12}$ heteroalkyl, $C_5$-$C_{14}$ aryl, substituted $C_5$-$C_{14}$ aryl, $C_5$-$C_{14}$ heteroaryl, or substituted $C_5$-$C_{14}$ heteroaryl; $L^1$ and $L^2$ are independently lower alkylene optionally substituted and/or containing a hydrolytically cleavable linkage; and X is selected from —(CO)—O—, —CH═CH—O—, —O—$CR_2$—O—, —CH(OH)—O—, —(CO)—O—(CO)—, —O—(CO)—O), —(CO)—NR—, —O—(CO)—NR—, —$CH_2$—NR—, —CHR—NR—, —$CR_2$—NR—, —CH═N—, —CR═N—, -$Cy^1$(═O)—, -$Cy^2$-, —NR—NR—, -$Cy^3Cy^4$-, —(CO)—S—, —P(O)(OR)—O—, —$SO_2$—OR—, —$C(OR)_2$—O—, —O—, —S—, —S—S—, —SiR'R"—O—SiR'R"—, —O—SiR'R"—O—, —SiR'R"—NR—SiR'R"—, and —NR—SiR'R"—NR—), wherein R is optionally substituted and/or heteroatom-containing $C_1$-$C_{12}$ hydrocarbyl, R' and R" are independently selected from hydrido and optionally substituted and/or heteroatom-containing $C_1$-$C_{12}$ hydrocarbyl, $Cy^1$ is a nitrogen containing heterocycle, $Cy^2$ is a five- or six-membered ring containing a —CH═N— linkage, and $Cy^3$ and $Cy^4$ are five- or six-membered rings each containing an acetal linkage.

12. The article of claim 11, wherein:

$R^1$ is hydrido or lower alkyl; $R^2$ is hydrido, lower alkyl, substituted lower alkyl, lower heteroalkyl, substituted lower heteroalkyl, $C_5$-$C_{14}$ aryl, substituted $C_5$-$C_{14}$ aryl, $C_5$-$C_{14}$ heteroaryl, substituted $C_5$-$C_{14}$ heteroaryl, $C_6$-$C_{16}$ alkaryl, substituted and/or heteroatom-containing $C_6$-$C_{16}$ alkaryl, or halo; $R^3$ and $R^4$ are independently hydrido or lower alkyl; $L^1$ and $L^2$ are independently lower alkylene optionally substituted with an allyl group; R is lower alkyl; and R' and R" are selected from hydrido, lower alkyl, and lower alkoxy.

13. The article of claim 12, wherein $R^3$ and $R^4$ are hydrido and $L^1$ and $L^2$ are unsubstituted lower alkylene.

14. The article of claim 12, wherein $R^3$ and $R^4$ are hydrido and m and n are zero.

15. The article of claim 1, wherein the article further comprises at least one additive selected from additional degradable components, nondegradable polymers, anti-oxidants, pro-oxidants, stability enhancers, tensile strength enhancers, photosensitizers, colorants, plasticizers, tackifiers, fillers, antistatic agents, flame retardants, and opacifiers.

16. The article of claim 1, wherein the hydrolytically cleavable linkage is a cyclic acetal linkage.

17. The article of claim 1, wherein the hydrolytically cleavable linkage is an ester linkage.

18. The article of claim 1, wherein the article further comprises at least one additional polymer.

19. The article of claim 18, wherein the additional polymer is a nondegradable polymer.

20. A degradable article at least partially comprising a degradable copolymer composed of at most 80 mole % of nonhydrolyzable monomer units resulting from polymerization of nonhydrolyzable olefin monomers, and at least 20 mole % of hydrolyzable monomer units resulting from polymerization of hydrolyzable olefin monomers containing at least one linkage that is hydrolytically cleavable under acidic or basic conditions, wherein the at least one hydrolytically cleavable linkage is contained within the backbone of the copolymer, and wherein the degradable copolymer is prepared by addition polymerization, in the presence of a catalytically effective amount of a metallocene complex of a Group 4, 5, or 6 transition meta and a catalyst activator that renders the complex cationic or zwitterionic, of a monomer mixture comprising the nonhydrolyzable olefin monomer and the hydrolyzable olefin monomer.

* * * * *